(12) United States Patent
Suto et al.

(10) Patent No.: US 6,196,897 B1
(45) Date of Patent: Mar. 6, 2001

(54) AUTOMATIC LAPPING METHOD AND A LAPPING APPARATUS USING THE SAME

(75) Inventors: Koji Suto; Kazuo Yokoi; Yoshiaki Yanagida; Motoichi Watanuki; Tomokazu Sugiyama, all of Kawasaki (JP)

(73) Assignee: Fujitsu Limted, Kawasaki (JP)

( * ) Notice: Subject to any disclaimer, the term of this patent is extended or adjusted under 35 U.S.C. 154(b) by 0 days.

(21) Appl. No.: 08/957,101

(22) Filed: Oct. 24, 1997

(30) Foreign Application Priority Data

Aug. 4, 1997 (JP) .................................... 9-089728

(51) Int. Cl.$^7$ .................................................. B24B 49/00
(52) U.S. Cl. .................................... 451/8; 451/8; 451/10; 451/11; 451/5; 451/24; 451/57
(58) Field of Search .................................... 451/8, 10, 11, 451/5, 24, 57

(56) References Cited

U.S. PATENT DOCUMENTS

| | | | |
|---|---|---|---|
| 5,203,119 | * | 4/1993 | Cole .......................................... 451/5 |
| 5,486,129 | * | 1/1996 | Sandhu et al. .......................... 451/21 |
| 5,525,091 | * | 6/1996 | Lam et al. ................................ 451/5 |
| 5,579,717 | * | 12/1996 | Crandell et al. .................. 29/603.01 |
| 5,720,845 | * | 2/1998 | Liu ........................................ 156/345 |
| 5,733,177 | * | 3/1998 | Tsuchiya et al. ..................... 451/288 |
| 5,749,769 | * | 5/1998 | Church et al. .......................... 451/57 |
| 5,876,264 | * | 3/1999 | Church et al. ........................... 451/5 |

* cited by examiner

*Primary Examiner*—Robert A. Rose
(74) *Attorney, Agent, or Firm*—Greer, Burns & Crain, Ltd.

(57) ABSTRACT

The present invention relates to an automatic lapping method for lapping a work piece and a lapping apparatus using the same. The lapping apparatus laps a work piece by moving the mounting base 103 relatively to a lapping plate 104. On a coarse processing step, the lapping plate 104 is controlled with high speed as detecting a remaining amount for lapping the work piece. Then, on a fine processing step, said lapping plate 104 is controlled with low speed by detecting that the remaining amount h for lapping said work piece has reached to a predetermined amount H0. Thereby, it becomes possible to continuously execute the coarse processing and the fine processing in one lapping apparatus.

12 Claims, 22 Drawing Sheets

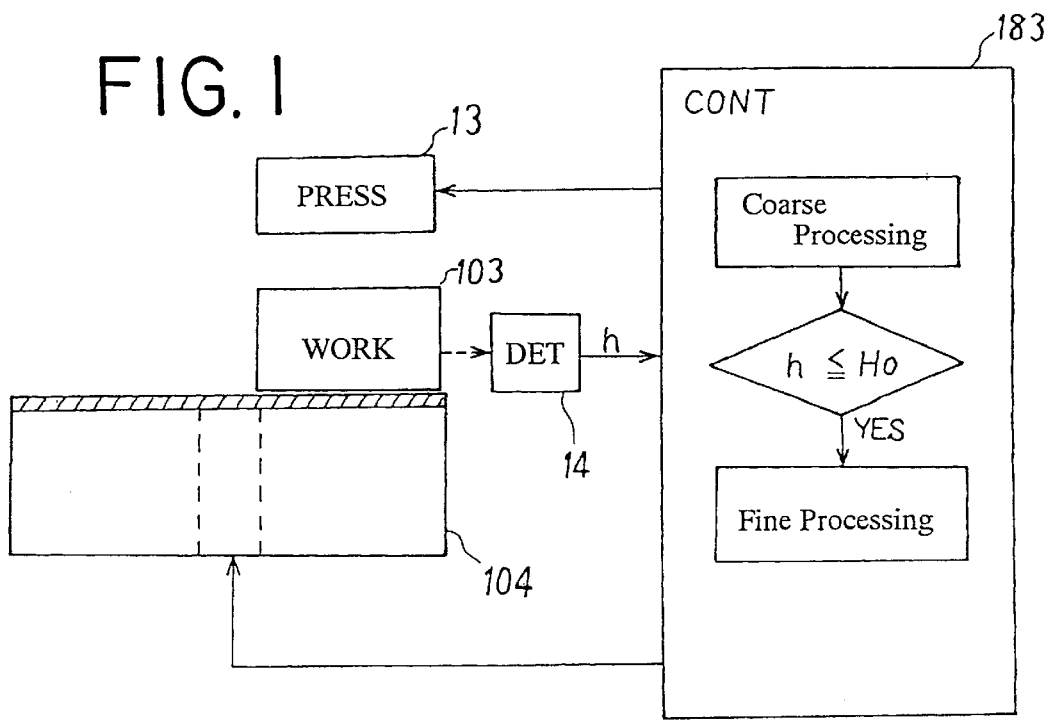
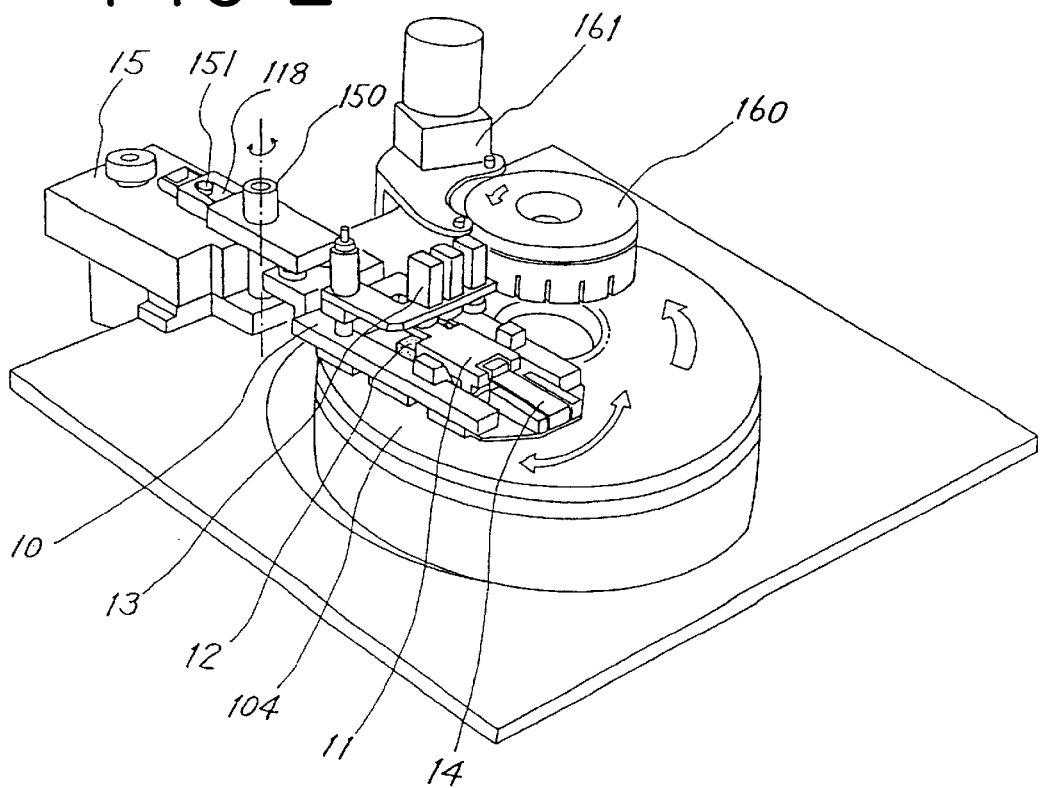

FIG. 20

| STAGE | Rotary Time of Lapping Plate | Swinging Speed | Number of Air Cylinders |
|---|---|---|---|
| 1 | 50 | 6 | 1 |
| 2 | 50 | 6 | 3 |
| 3 | 50 | 6 | 3 (or 2) |
| 4 | 15 | 6 | 0 |

AUTOMATIC LAPPING METHOD AND A LAPPING APPARATUS USING THE SAME

BACKGROUND OF THE INVENTION

1. Field of the Invention

The present invention relates to a method for automatically lapping a work piece and a lapping apparatus using the same. More particularly, it relates to a lapping method for continuously lapping the work piece and a lapping apparatus using the same.

For example, after forming a magnetic head thin film, the magnetic head thin film is lapped on the process of manufacturing a magnetic head. Heights of a magnetic resistance layer and a gap of the magnetic head thin film of the magnetic head are made to have a certain constant by lapping on the manufacturing process of the magnetic head.

For the heights of the magnetic resistance layer and the gap, sub-micron order of accuracy is required. Therefore, it is necessary to lap work pieces or magnetic thin films with high accuracy.

2. Description of the Related Art

FIGS. 21A and 21B are explanatory diagrams of a composite type magnetic head.

As shown in FIG. 21A, the composite type magnetic head includes a magnetic resistance element 82 formed on a base plate 81 and a writing element 85. The magnetic resistance element 82 is formed of a magnetic resistance film 83 and a pair of conducting films 84 as shown in FIG. 21B. A resistance value of the magnetic resistance element 82 is varied by an external magnetic field. The magnetic resistance element 82 has a function to read out an electric current having a value according to magnetic field strength of a track 90 on a magnetic disk.

As the magnetic resistance element 82 is an element for reading out the current, it is required to provide a different element 85 for writing. The writing element 85 includes an inductive head. The inductive head is comprised of a lower magnetic pole 86, an upper magnetic pole 88 faced to the lower magnetic pole 86 with a certain gap, and a coil 87 provided between the lower and upper magnetic poles 86 and 88 to magnetically excite them. A non-magnetic insulating layer 89 is provided around the coil 87.

In such the composite type magnetic head, it is required to have a constant resistance value of the magnetic resistance film 83 in the magnetic resistance element 82 for each magnetic head. However, it is difficult to make the resistance value be constant or uniform on the process of manufacturing the thin film for the magnetic head. Therefore, after forming the thin film of the magnetic head, a height (width) h of the magnetic resistance film 83 is adjusted so that a resistance value may be uniformed.

FIGS. 22A, 22B, 23A, 23B, 23C and 23D are diagrams explaining the process of manufacturing the composite type magnetic head.

As shown in FIG. 22A, a plurality of composite type magnetic heads are formed on a semiconductor wafer 100 by a thin film technique. Next, as shown in FIG. 24B, the wafer 100 is cut into strips to make a plurality of row bars 101. A row bar 101 includes a plurality of the magnetic heads 102 arranged in one row. Resistance elements 102a are provided on the left and right ends, and at the center of the row bar 101 for monitoring the process of the manufacturing.

As described above, the height of the magnetic resistance film 83 for the magnetic head 102 is lapped to be constant or uniform. However, the row bar 101 is extremely thin, for example, about 0.3 mm. It is, therefore, difficult to mount the row bar 101 directly to a lapping jig, and as shown in FIG. 22C, the row bar 101 is bonded to a mounting tool or base 103 with heat dissoluble wax.

Then, as shown in FIG. 23A, the row bar 101, which is bonded to the mounting base 103, is placed on a lapping plate 104 for lapping the row bar 101. As known in Japanese Unexamined patent application published No. 2-124262 (U.S. Pat. No. 5,023,991) or Japanese Unexamined patent application published No. 5-123960, the resistance value of the resistance element 102a for monitoring is always measured while lapping the row bar 101. Then, it can be detected whether or not the magnetic resistance film of the magnetic head 102 has become a targeted height.

When it is detected by the measurement of the resistance value that the magnetic resistance film has been lapped to the targeted height, the lapping processing is stopped. After that, a slider can be formed on a bottom surface 101-1 of the row bar 101, as shown in FIG. 23B.

The row bar 101 is further cut into a plurality of magnetic heads 102, as the row bar 101 is mounted on the mounting base 103 as shown in FIG. 23C. Each magnetic head 102 is taken out from the mounting base 103 by heating and melting the heat dissoluble wax, as shown in FIG. 25D.

In this way, a row bar 101 including a plurality of the magnetic heads 102 is prepared, and lap processing is performed for the row bar 101. Therefore, the magnetic resistance film on the plurality of magnetic heads 102 can be lapped by one step.

FIG. 24 is an explanatory diagram of a conventional lapping apparatus.

The lapping apparatus has a rotary lapping plate 104, as shown in FIG. 24. A supporting block 105 has three pads 105a contacting to the lapping plate 104. The pads 105a smoothly spread slurry (abrasive liquid) on the lapping plate 104 and fill the slurry into the lapping plate 104. The pads 105a, further, may soften pressure of the supporting block 105 to the surface of the lapping plate 104.

The supporting block 105 is swung on the lapping plate 104 by a swing mechanism 106. The supporting block 105 supports the mounting base 103. Therefore, the row bar 101, which is bonded to the mounting base 103, is lapped by the rotation of the lapping plate 104 and the swing of the block 105.

In the conventional lapping apparatus, speed and pressure on lapping process are set as to be constant from starting to finishing the process.

It has been possible to reduce the time required for the processing by increasing rotating times of a lapping plate or giving higher pressure. Thereby, it becomes possible to save the time for the lapping process. However, there has been a problem to lower quality of lapping when the processing speed is increased.

On the other hand, when the speed for the lapping process is decreased to obtain good quality of lapping, there would be another problem to take much time for the lapping process.

It may be considered that a first lapping apparatus for speeding the processing up and a second lapping apparatus for speeding the processing down are employed together. After executing a coarse processing in the first lapping apparatus, a fine processing is performed by the second lapping apparatus. However, the work piece has to be set on the lapping apparatus twice according to the method, and therefore, troublesome for an operator and take much time. Therefore, it is unsuitable for mass production of the work pieces.

SUMMARY OF THE INVENTION

Accordingly, it is an object of the present invention to provide an automatic lapping apparatus to save processing time and realize quality of lapping process and a lapping apparatus using the same.

It is another object of the present invention to provide a lapping method for automatically changing coarse processing and fine processing and a lapping apparatus using the same.

It is further object of the present invention to provide a lapping method for automatically changing coarse processing and fine processing according to a remaining amount of processing the work piece and an apparatus using the same.

BRIEF DESCRIPTION OF THE DRAWINGS

FIG. 1 is a principle diagram of the present invention.

FIG. 2 is a perpendicular view of an example of a lapping apparatus employing the present invention.

FIG. 20 is an explanatory diagram of processing steps shown in FIGS. 16 and 17.

DESCRIPTION OF THE PREFERRED EMBODIMENTS

Figure 3:
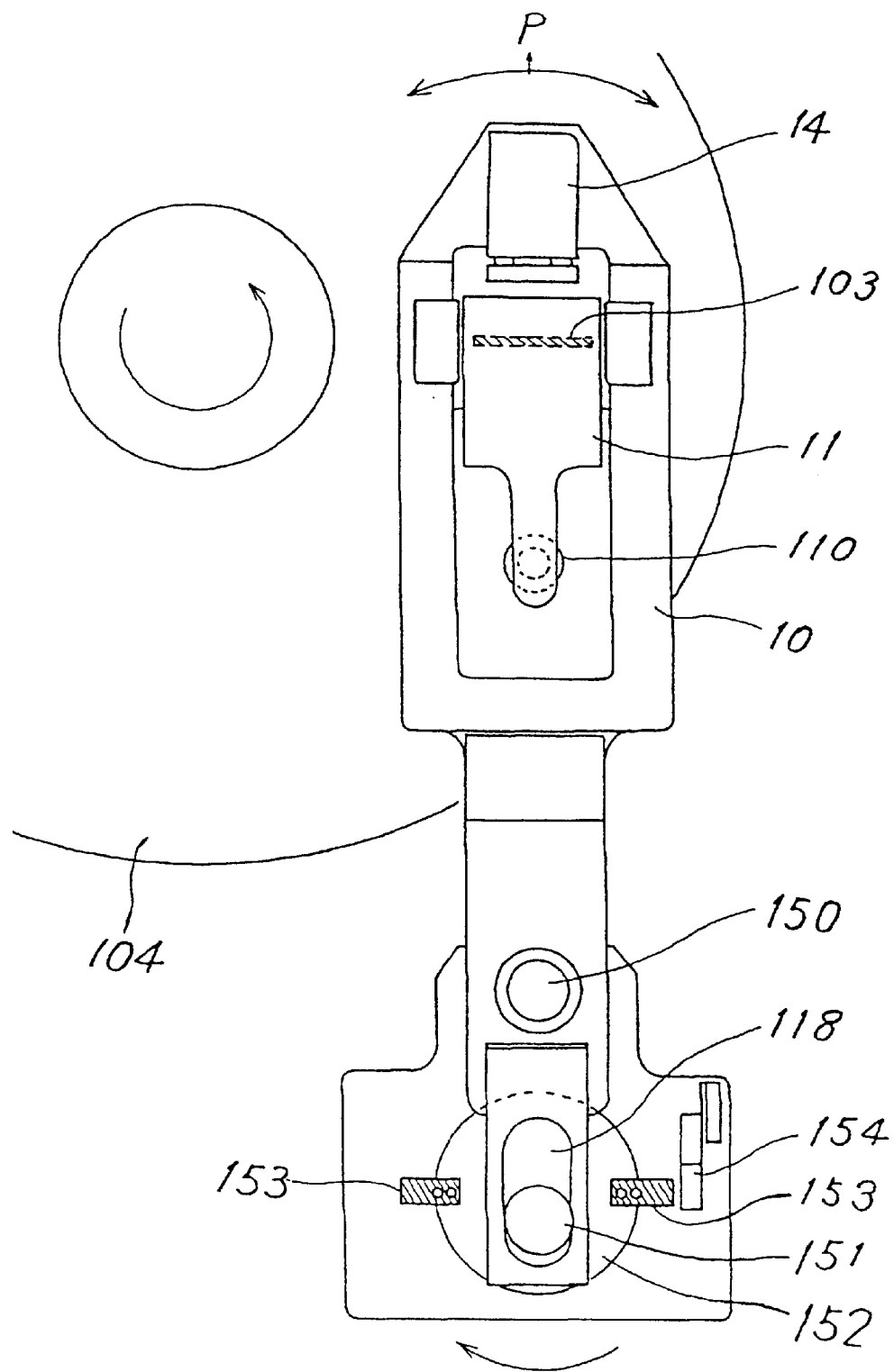
FIG. 3 is a top view of the lapping apparatus shown in FIG. 2.

Embodiments according to the present invention will be now explained in accompanying with the attached drawings. Throughout the following descriptions, the same reference numerals and symbols are used to denote and identify corresponding or identical components.

FIG. 1 is an principle diagram of the present invention.

A lapping apparatus according to the present invention laps a work piece by relatively moving a mounting base 103 and a lapping plate 104. In a coarse processing, the lapping plate 104 is controlled with a high processing speed, as detecting a remaining amount h for lapping the work piece. In a fine processing, the remaining amount h for lapping the work piece is detected as reached to a predetermined amount H0, and the lapping plate 104 is controlled with a low processing speed.

Further, the lapping apparatus according to the present invention has a lapping plate 104, which relatively moves to the mounting base 103, a detecting part 14 for detecting a remaining amount h for lapping a work piece, and a control part 183 for detecting the remaining amount h for lapping the work piece becomes a predetermined amount H0 and controlling the lapping plate 104 with a low speed, after controlling the lapping plate 104 with a high speed.

According to the present invention, it is possible to automatically shift the coarse processing to the fine processing according to the remaining amount for lapping the work piece in one lapping apparatus. It is also possible to save the time required for lapping the work piece as the coarse processing is performed. The fine processing is also performed, thus realizing good quality of lapping the work piece. Additionally, as the coarse processing and the fine processing are performed in one lapping apparatus, an operator has to set the work piece to the lapping apparatus, one time. Thereby, it is possible to save the time for operation. In the apparatus, the processing is automatically shifted from the coarse processing to the fine processing, as detecting a remaining amount for lapping. Therefore, it is also possible to move from the coarse processing to the fine processing in an appropriate time.

Figure 4:
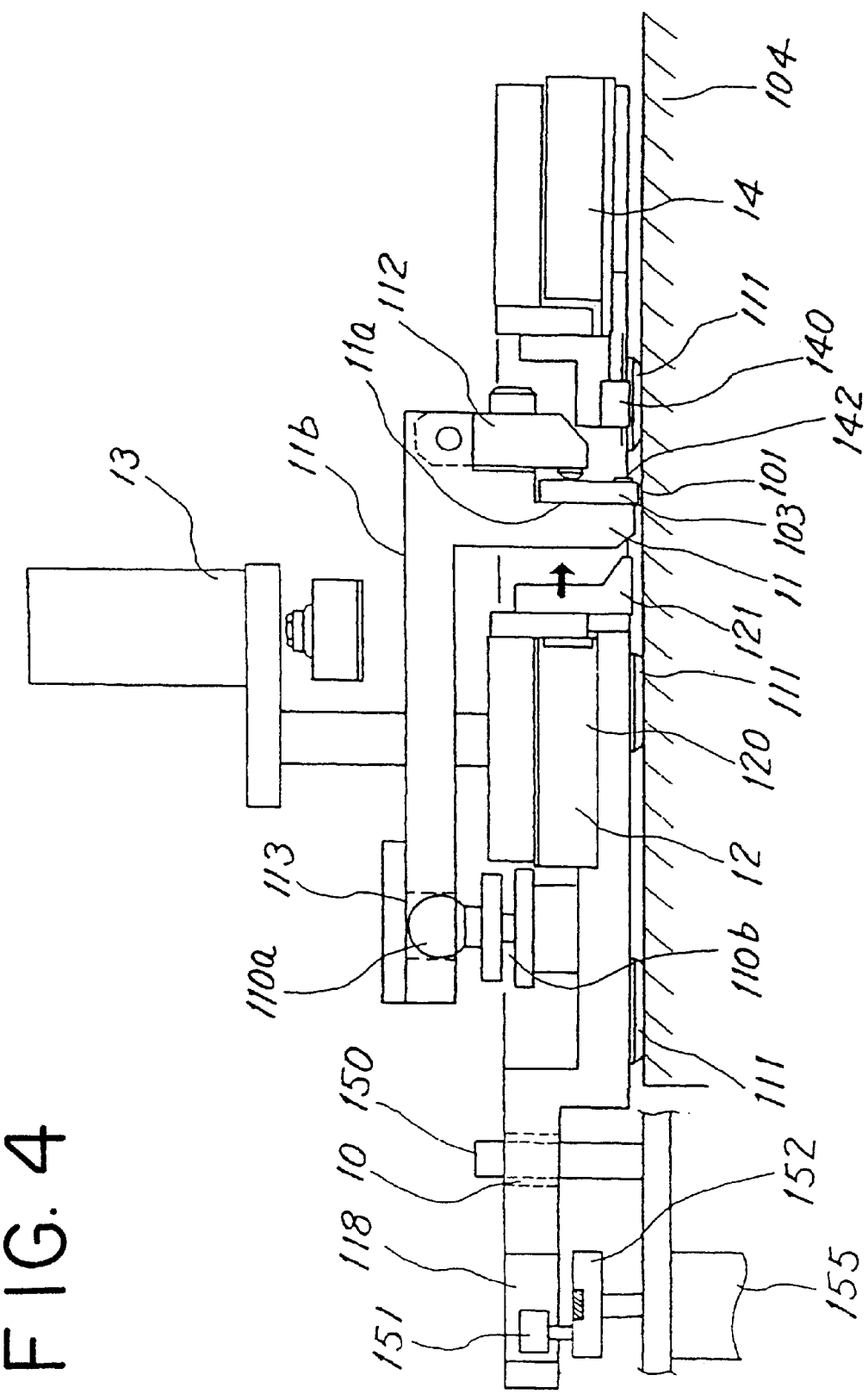
FIG. 4 is a side view of the lapping apparatus shown in FIG. 2.
Figure 5:
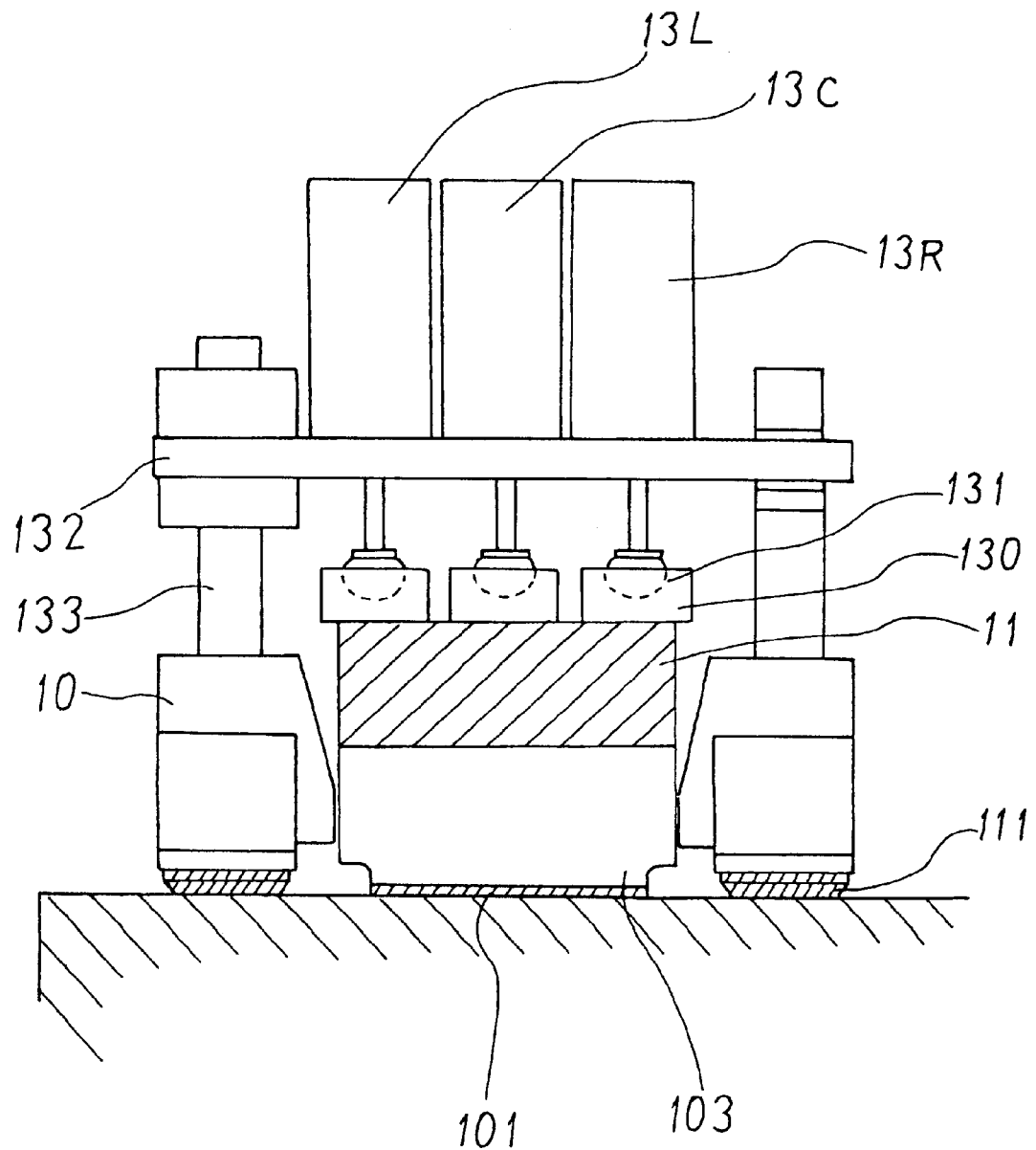
FIG. 5 is a cross sectional diagram of the lapping apparatus shown in FIG. 2.

FIG. 2 is a perpendicular view of one example of a lapping apparatus according to the present invention, FIG. 3 is a top view of the lapping apparatus of one embodiment according to the present invention, FIG. 4 is a side view of the lapping apparatus shown in FIG. 2, and FIG. 5 is a cross sectional view of the lapping apparatus shown in FIG. 2.

As shown in FIGS. 2, 3 and 4, the lapping plate 104 is rotated by a motor, not shown in the diagrams. Six pads 111 are provided under a lapping base 10. The lapping base 10 is set on a rotary shaft 150 fixed on the apparatus, so that the base 10 can be rotated around the shaft 150. A cam 118 is provided on other end of the lapping base 10.

A swinging mechanism 15 swings the lapping base 10. The swinging mechanism 15 has a swinging motor 155, a cam pulley 152 rotated by the swing motor 155, and a swing cam 151 provided on the cam pulley 152. A swinging cam 151 is engaged with a cam hole 118 of the lapping base 10, as shown in FIGS. 3 and 4.

Therefore, the lapping base 10 swings toward an arrow having both directions shown in FIG. 3 according to the rotation of the swinging motor 155. Two sensor actuators 153 are provided on a cam pulley 152. The sensor 154 detects the sensor actuators 153. The sensor actuators 153 are positioned so as to be detected by the sensor 154 when the lapping base 10 is located on a point P, i.e., a central point of swinging, shown in FIG. 3.

Returning back to FIG. 2, a pressure mechanism 13, which is explained later, is provided on the lapping base 10. The pressure mechanism 13 puts pressure on the adapter 11. The adapter 11 is set on the lapping base 10. The adapter 11 is formed like a L formation as illustrated in FIG. 4. A mounting base 103 to which a work piece 101 is bonded is set on a first surface 11*a* of the adapter 11. The mounting base 103 is fixed to the first surface 11*a* of the adapter 11 by a fixing mechanism 112.

The adapter 11 has a second surface 11*b*. A holder 113 is provided on an end of the second surface 11*b*. A supporting mechanism 110 provided on the lapping base 10 has a screw 110*b* for adjusting the height, and a spherical supporting section 110*a*. The holder 113 of the adapter 11 is engaged with the supporting section 110*a*.

Therefore, the adapter 11 is supported by the lapping base 10 at one point. The adapter 11 contacts to a lapping plate 104 via the processing surface of the work piece 101. That is, the adapter 11 is supported by one point position of the supporting mechanism 110, and other two point positions, which are provided on both edges of the mounting base 103, to which the work piece 101 is bonded. Thereby, the mounting base 103 can be rotated around the center of the supporting mechanism so that the mounting base 103 can follow the lapping plate 104 independently from the lapping base 10.

Accordingly, the work piece 101 bonded to the mounting base 103 can be lapped by referencing the lapping plate 104 as a standard regardless of the accuracy of the lapping base 10. Thereby, it becomes possible to uniformly lap the work piece 101.

Returning back to FIG. 2, an unload mechanism 12 is provided on the lapping base 10. The unload mechanism 12 pushes the adapter 11 as shown in FIG. 4 so that the adapter 11 rotates around the supporting section 110*a* to evacuate the work piece 101 from the lapping plate 104. This unload mechanism 12 has an unload block 121 and an unload cylinder 120.

Figure 7A:
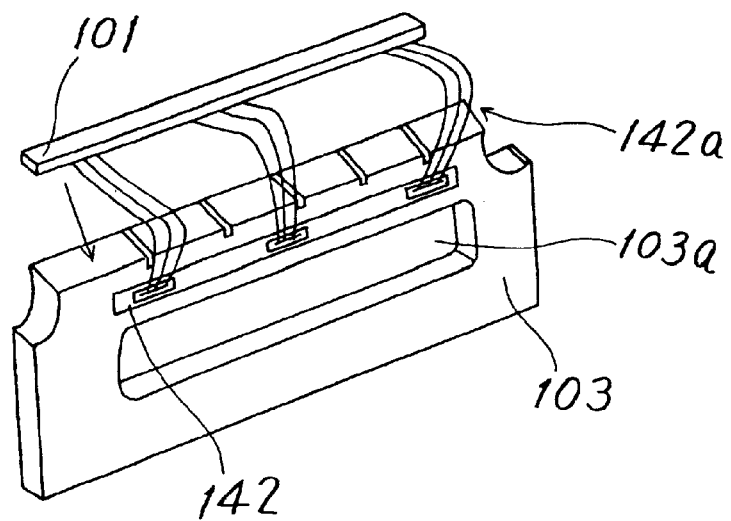
FIGS. 7A and 7B are explanatory diagrams of the work piece shown in FIG. 2.
Figure 7B:
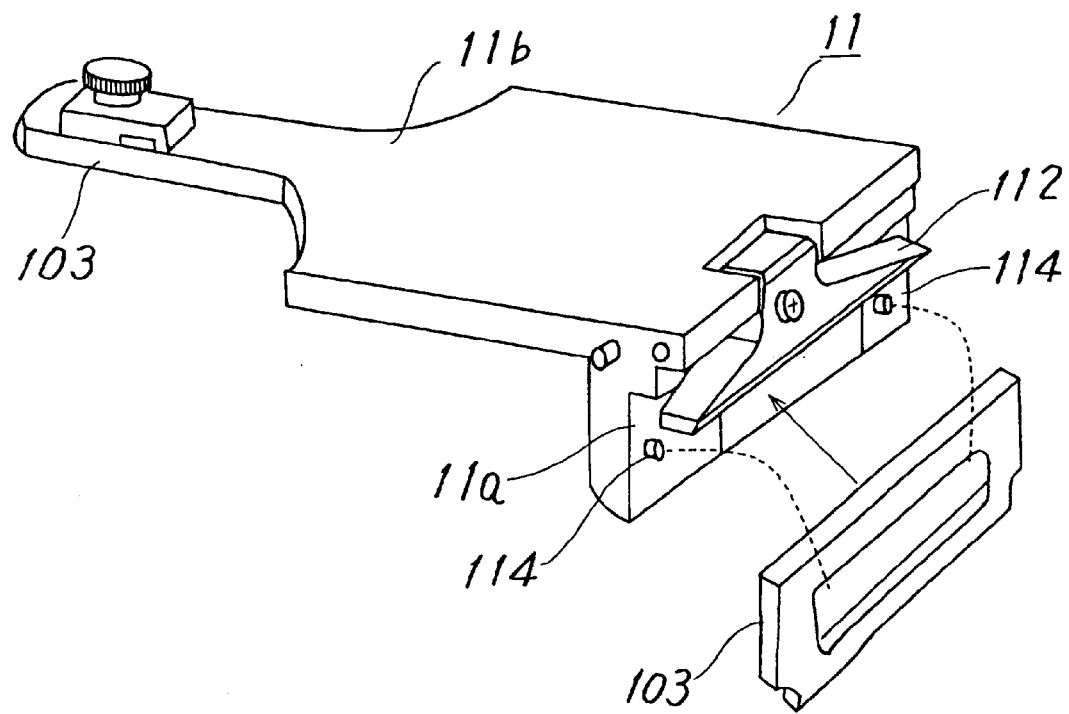

Unload operation will be now explained in accompanying with FIGS. 7A and 7B. When a value of a resistance for monitoring the lapping of the row bar 101 becomes a 15 predetermined value, it is required to stop the lapping. When the rotation of the lapping plate 104 is stopped, lapping is stopped. However, the lapping plate 104 is stopped after reducing the speed by a stopping instruction. Therefore, the work piece should be lapped until the lapping plate 104 is finally stopped, thus causing dispersion of accuracy of the size of the work piece, that is, a row bar 101. Additionally, there is a case where a mark of the surface plate is put on the work piece.

Therefore, an unload cylinder 120 and an unload block 121 are provided on the lapping base 10 as shown in FIGS. 7A and 7B. As shown in FIG. 7B, the unload cylinder 120 is activated to stick the unload block 121 out when the value of the resistance for monitoring the lapping becomes the predetermined value. Then, the adapter 11 rotates above around the supporting section 110*a* to separate the row bar 101 from the lapping plate 104. Thereby, when the value of the resistance for monitoring the lapping becomes the predetermined value, lapping may be immediately stopped. Therefore, accuracy of the size of the row bar 101 can be realized. Further, as the adapter 11 is set on the lapping base 10, unloading of the work piece, that is, a row bar 101 becomes easy.

As shown in FIG. 3, when the sensor 154 detects that the actuators 153 are positioned at the point P, i.e., the central point of swinging, the unloading is performed. This is because the mark of the lapping plate 104 is put on the surface plate of the work piece according to the stopped position if the stop position of the swinging mechanism is random.

It is inclined to put the mark of the surface 104 on the work piece because speed of swinging becomes lower on both ends of swinging portion. On the contrary, the speed of swinging becomes highest at the center position P of swinging. Therefore, it is not easy to put the mark of the surface plate 104 on the work piece. The sensor 154 detects that the actuator 153, i.e., the sensor 154 detects that the lapping base 10 reaches to the center position P of swinging, unloading of the work piece is performed as described above. Thereby, it is possible to prevent from putting the mark of the surface plate 104 on the work piece 101 when the swinging mechanism stops.

The probe mechanism 14 is provided on the end of the lapping base 10. The probe mechanism 14 electrically contacts to an resistance element for monitoring processing of the work piece, that is, the row bar 101 mounted to the mounting base 103, as shown in FIG. 4. The probe mechanism 14 has a probe 140 electrically, which contacts to an resistance element for monitoring the processing.

Returning back to FIG. 2, a correction ring 160 is rotated by a modified ring rotary mechanism 161. The correction ring 160 expands slurry (abrasive liquid) and fills the slurry into the lapping plate 104, so that the flatness of the lapping plate 104 may be kept.

As shown in the cross sectional view of FIG. 5, the pressure mechanism 13 includes three pressure cylinders 13L, 13C and 13R. The pressure cylinders 13L, 13C and 13R are supported by a supporting plate 132. The supporting plate 132 can rotate around a rotary shaft 133. Therefore, when setting the adapter 11 to the lapping base 10, it is possible to release upper space of the lapping base 10 and set the adapter 11 to the lapping base 10 by rotating the supporting plate 132.

The pressure cylinder 13L on the left side puts pressure to a left portion of the adapter 11. The pressure cylinder 13C on center puts pressure on a center of the adapter 11. Further, the pressure cylinder 13R on the right portion puts pressure on a right portion of the adapter 11. A pressure block 130 is provided on the end of each of the pressure cylinders 13L, 13C and 13R. The pressure blocks 130 are supported by a spherical section 131. Accordingly, it is possible to uniformly put pressure power of the pressure cylinders onto the adapter 11.

Figure 6:
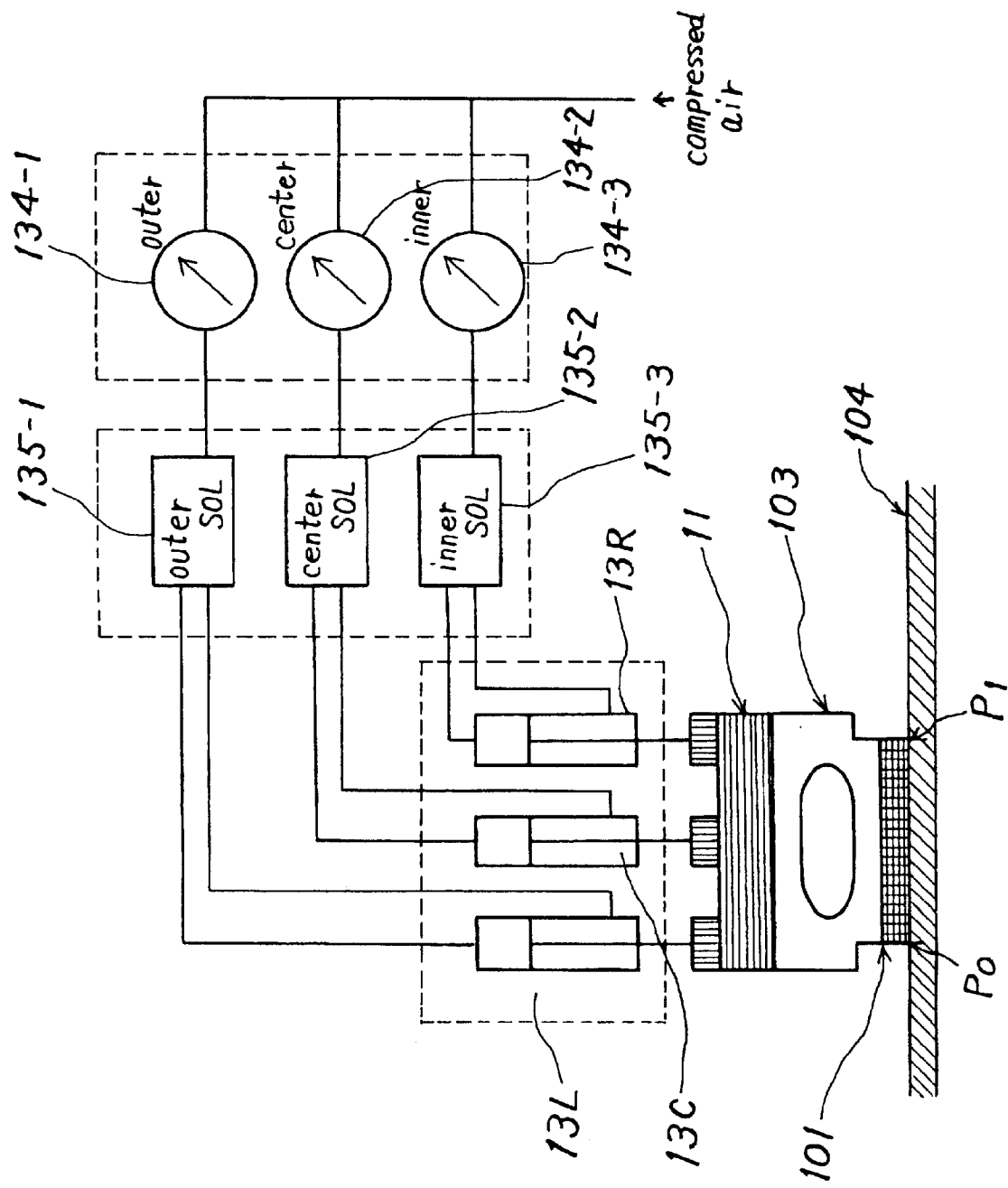
FIG. 6 is an explanatory diagram of a pressure mechanism shown in FIG. 5.

A pressure mechanism will be now explained in accompanying with FIG. 6. As shown in FIG. 6, solenoid valves 135-1, 135-2 and 135-3, and regulators 134-1, 134-2 and 134-3 are provided on cylinders 13L, 13C and 13R, respectively.

As the lapping plate 104 is rotated, the speed for rotating on a position P1 of an inner side of the mounting base 103 is different from that on a position P0 of an outer side. That is, the speed V0 on the position P0 of the outer side is higher than the speed V1 on the position P1 of the inner side. Therefore, the processing speed on the outer side becomes higher than that on the inner side.

To correct the difference, supply pressure of the outer cylinder 13L is set different from that of the inner cylinder 13R. That is, the supply pressure of the outer cylinder 13L is set lower than that of the inner cylinder 13R. Therefore, the set pressure of the outer regulator 134-1 is made lower than that of the inner regulator 134-3.

Thereby, the processing pressure on the outer side becomes lower than that on the inner side. Therefore, it becomes possible to control the processing speed on the outer side equal to that on the inner side.

Figure 8:
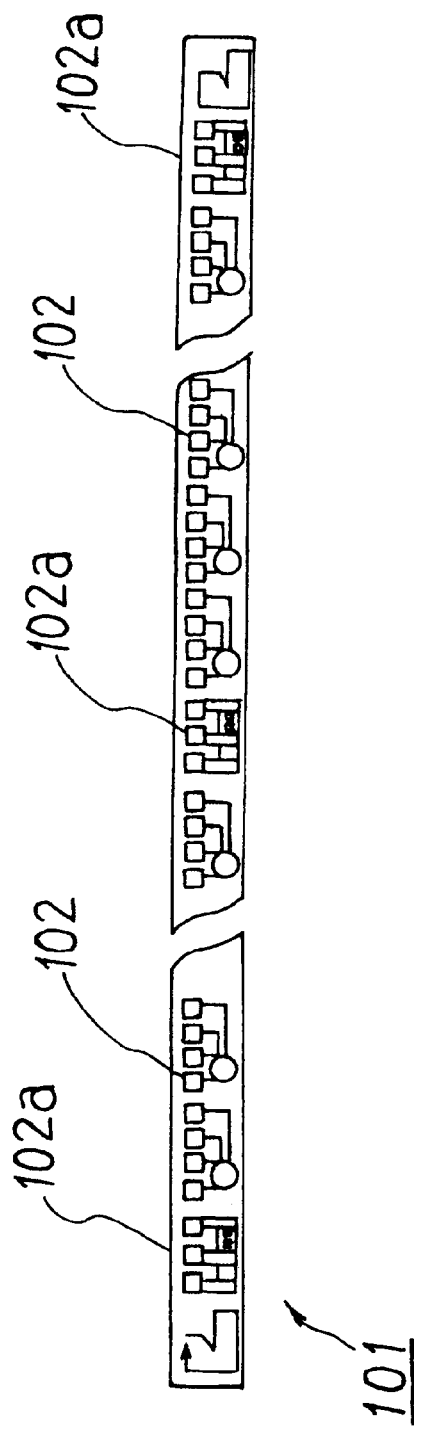
FIG. 8 is an explanatory diagram of the row bar shown in FIG. 7.
Figure 9:
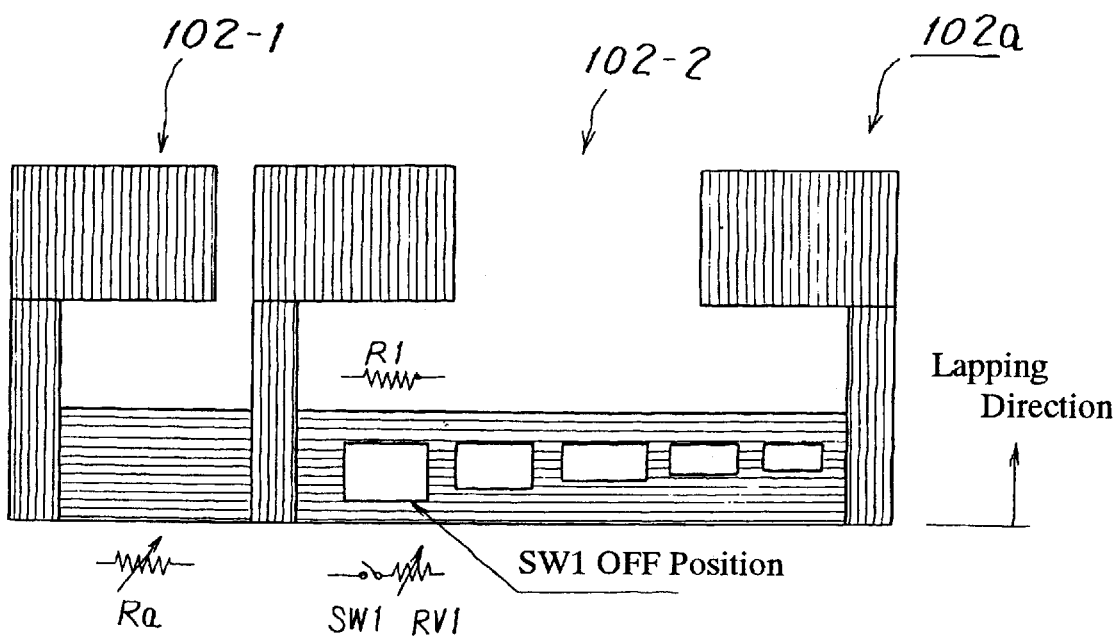
FIG. 9 is a structural diagram of an ELG element shown in FIG. 8.
Figure 10A:
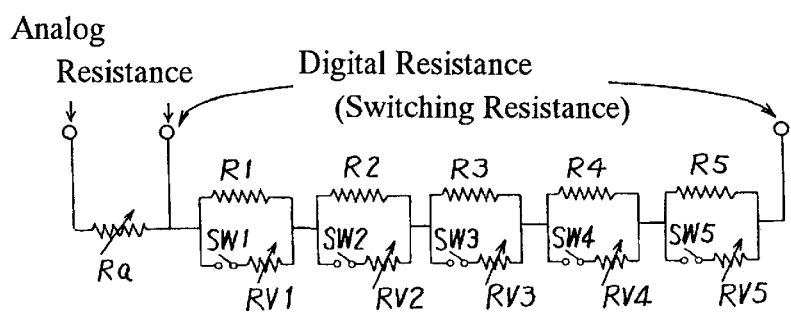
FIGS. 10A and 10B are explanatory diagrams of the ELG element shown in FIG. 9.
Figure 10B:
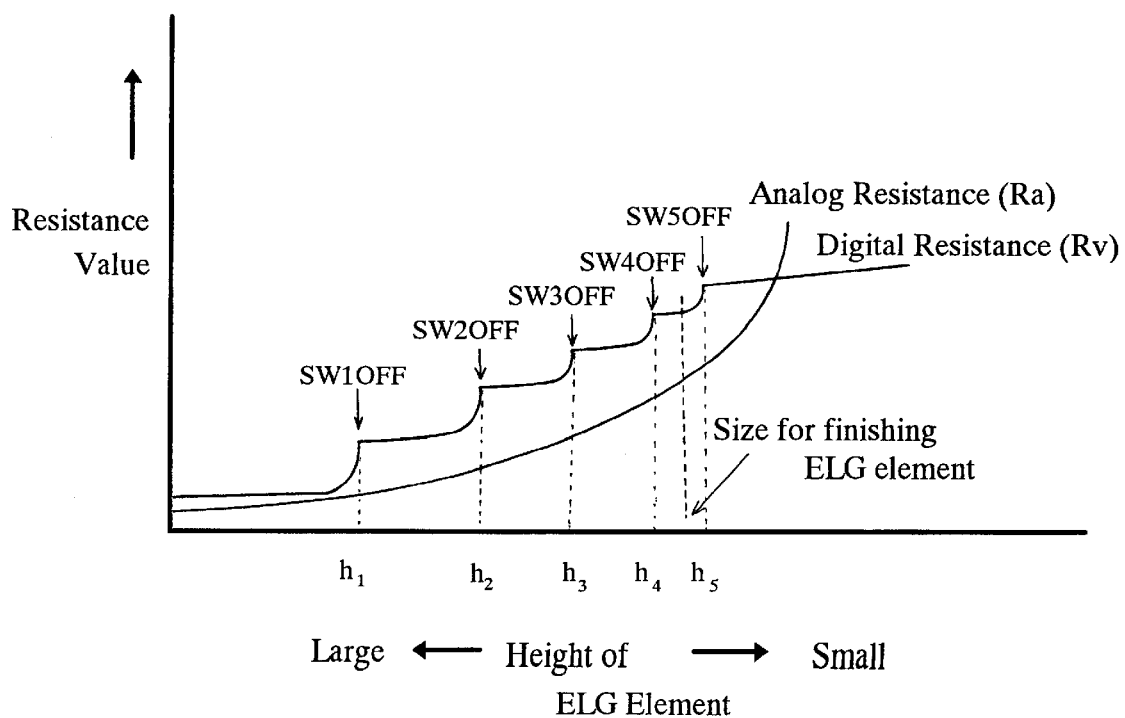

FIGS. 7A and 7B are explanatory diagrams of the work, FIG. 8 is an explanatory diagram of a row bar, FIG. 9 is a structural diagram of an ELG element shown in FIG. 10, and FIGS. 10A and 10B are explanatory diagrams of the ELG element shown in FIG. 9.

As shown in FIG. 7A, the mounting base 103 has a mounting hole 103a. The row bar 101 is bonded on the mounting base 103. A terminal printed circuit board 142 is provided on the mounting base 103. The terminal printed circuit board 142 has a large space. The terminals of resistance elements for monitoring on the row bar 101 described later, i.e., ELG elements, are connected to terminals of the terminal printed circuit board 142 by bonding wires 142a.

The terminal space of ELG elements on the row bar 101 is small. Additionally, the terminals of the ELG elements are covered with the abrasive liquid. Therefore, even if the terminals are directly contacted to the probe 140, resistance measurements can not be stably executed. Therefore, in the present invention, the probe 140 is contacted to the terminal printed circuit board 142. As the terminal printed circuit board 142 can be provided on the position away from the lapping surface 104, and it may have a large terminal spare thereon. It becomes possible to execute stable resistance measurement.

As shown in FIG. 7B, the mounting base 103 may be mounted to the adapter 11. The adapter 11, which engages to a hole 103a of the mounting base 103 has protrusions 114 for supporting the mounting base 103, and a fixing block 112. The mounting base 103 is positioned by the protrusions 114, and is set between the first surface 11a and the fixing block 112.

As shown in FIG. 8, the row bar 101 includes a plurality of magnetic heads 102 and ELG elements 102a. The ELG elements 102a are provided on three positions of left, center, and right of the row bar 101.

As shown in FIG. 9, the ELG element is formed of an analog resistance 102-1 and a digital resistance 102-2. The analog resistance 102-1 has a pattern in which value of resistance becomes larger according to the reduction of the resistance film. The digital resistance 102-2 includes a pattern in which value of resistance becomes off when the resistance film is reduced until becoming to a constant value.

Therefore, an equivalent circuit is expressed as shown in FIG. 10A, and the analog resistance 102-2 is expressed as a variable resistance Ra. As shown in FIG. 10B, as reducing the height of the ELG element, the resistance values increases. The digital resistance 102-2 is expressed by five switch resistances as shown in FIG. 10A. Then, FIG. 11B shows a line graph showing variation on each of off positions of the resistances.

The value of the ELG element corresponds to a height of the ELG element. The relationship between the resistance value Ra of the ELG element and the height h of the ELG element can be nearly expressed in the following equation:

$$Ra = a/h + b \quad (1)$$

Coefficients a and b can be obtained by an experiment in advance. However, the characteristic is varied depending on each ELG element. The digital resistance is provided to compensate such the problem. The off positions h1 to h5 of the digital resistances are predetermined in advance. The off position of a digital resistance is detected and the measured resistance values and the off position are substituted for the equation (1). If two of the off points on the digital resistances can be detected, coefficients a and b in the equation (1) can be obtained.

The resistance values of the ELG element comes to the height of the ELG element in this equation (1). Thereby, it is possible to obtain the height of the ELG element by measuring the resistance values of the ELG element. Therefore, it can be judged whether or not the height of the ELG element has reached to a targeted value. As mentioned later, as the height of the ELG element is reached to the targeted value, lapping is stopped.

Figure 11:
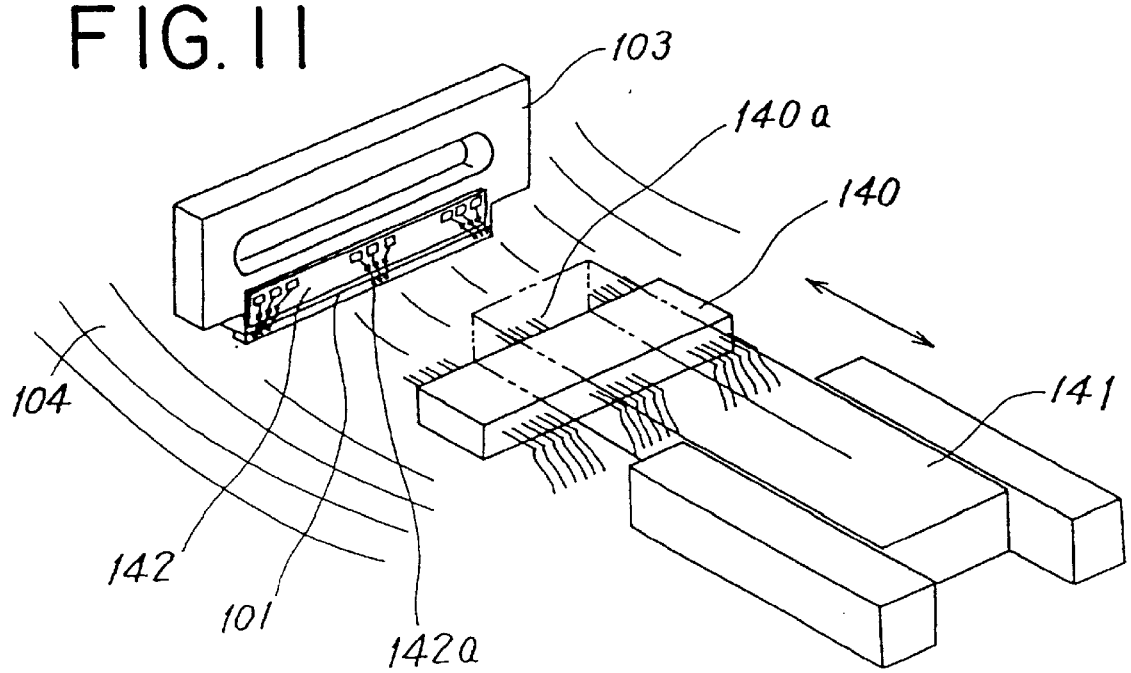
FIG. 11 is an explanatory diagram of the probe mechanism shown in FIG. 2.

FIG. 11 is an explanatory diagram of a probe mechanism shown in FIG. 2.

As shown in FIG. 11, the probe block 140 supports a plurality of probes 140a. The probe block 140 is moved by a probe cylinder 141. The probe cylinder 141 pushes the probe block 140, so that the probe 140a may contact the terminal printed circuit board 142. On the other hand, the probe 140a is evacuated to easily set the adapter 11 on the lapping base 10.

Figure 12:
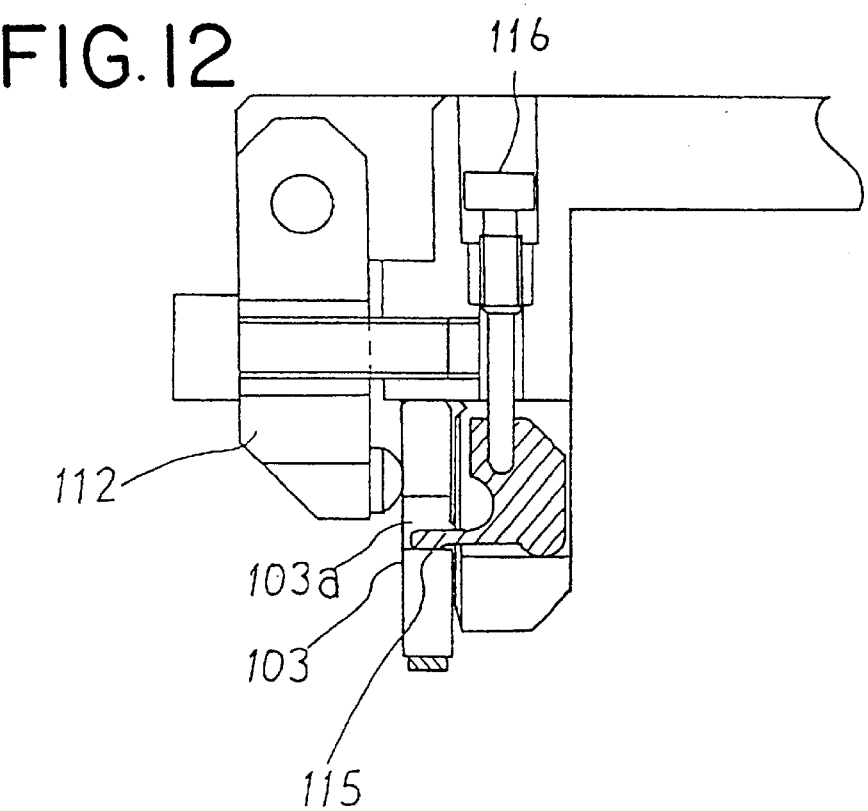
FIG. 12 is a cross sectional view of a bending mechanism shown in FIGS. 7A and 7B.
Figure 13A:
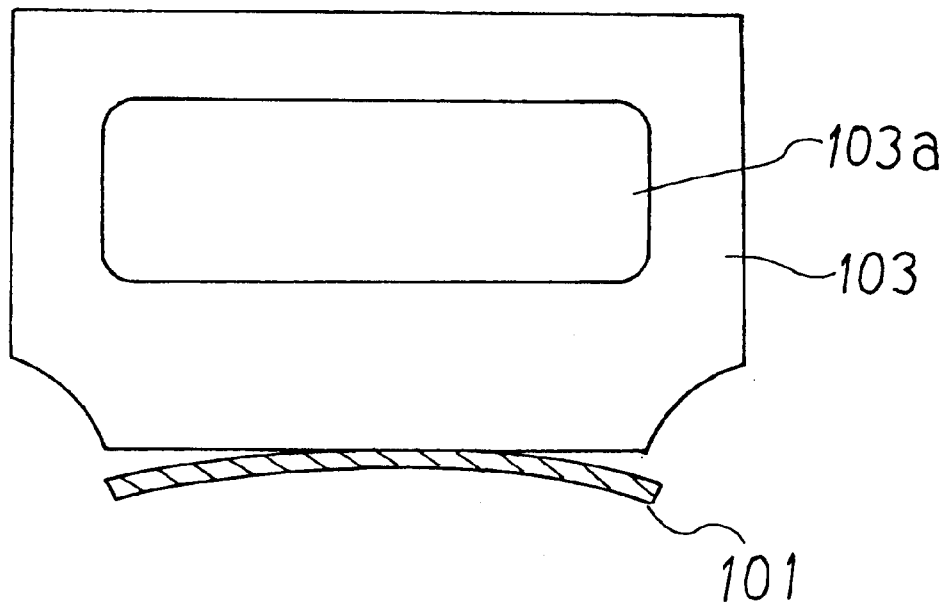
FIGS. 13A and 13B are explanatory diagrams of a bending operation of the bending mechanism shown in FIG. 12.
Figure 13B:
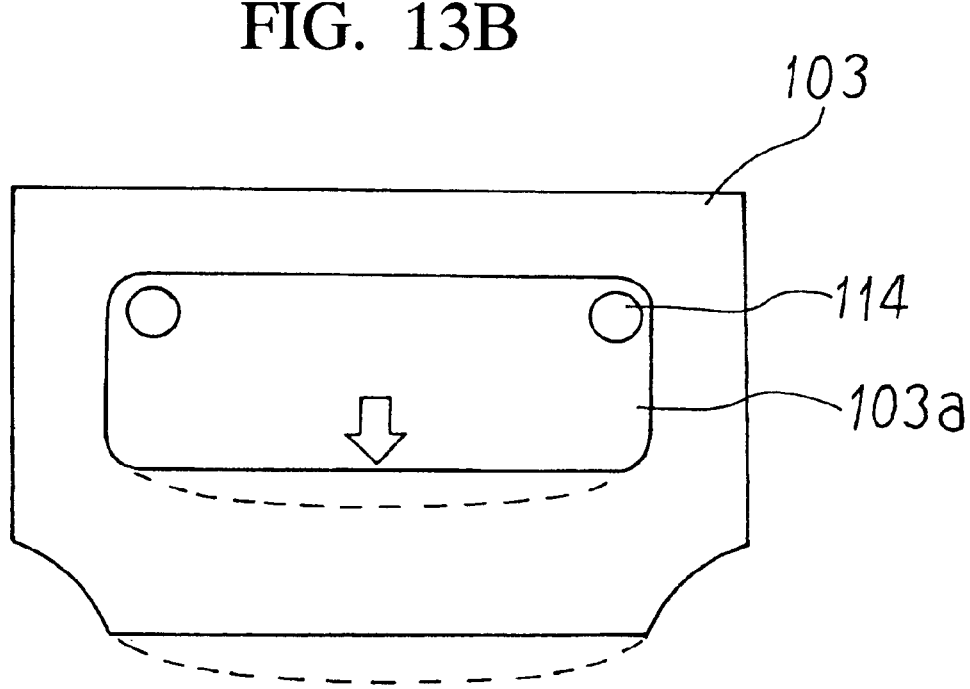
Figure 14:
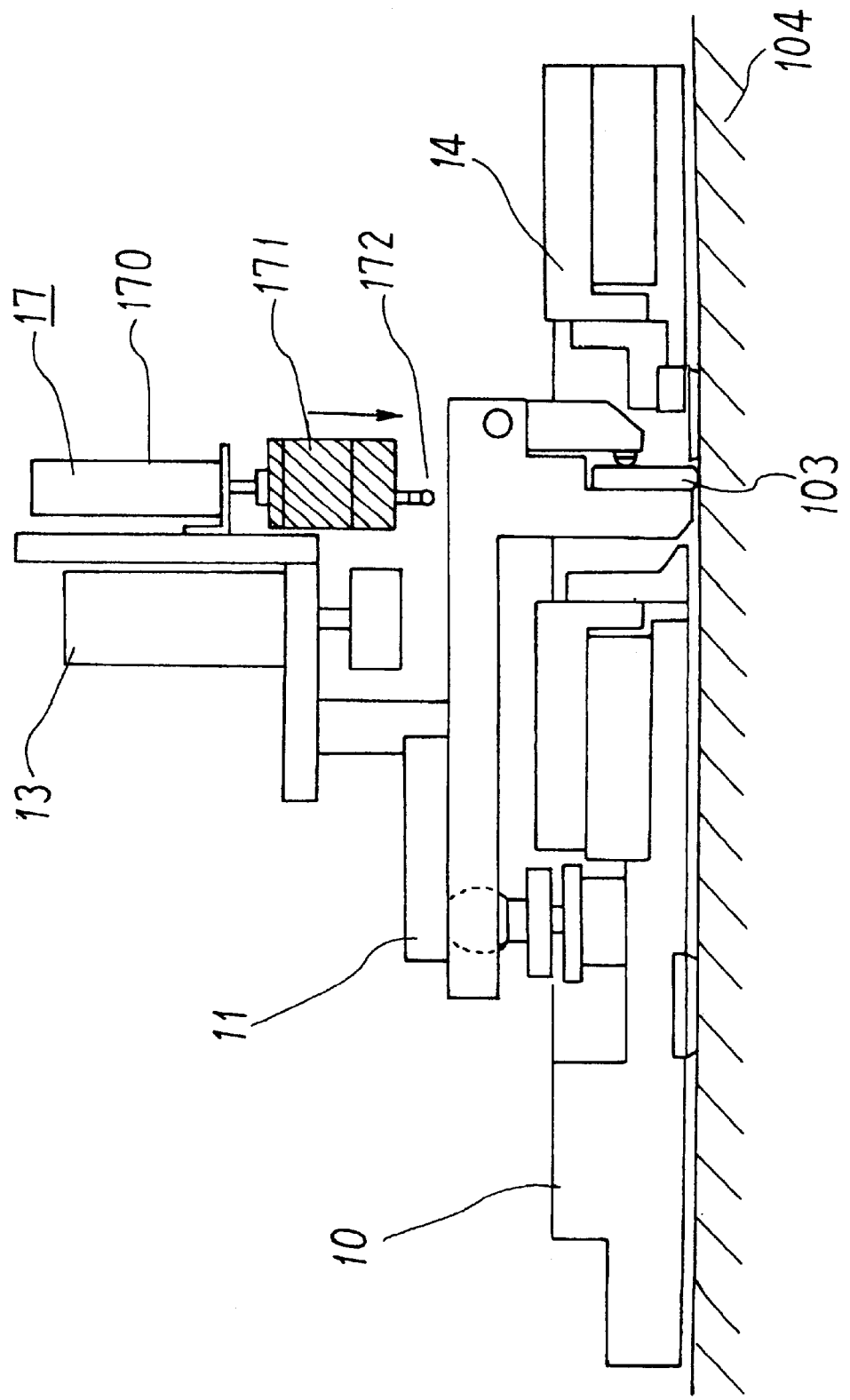
FIG. 14 is an explanatory diagram of the bending mechanism shown in FIGS. 7A and 7B.

FIG. 12 is a cross sectional view of a bending mechanism shown in FIGS. 7A and 7B. FIGS. 13A and 13B are explanatory diagrams of a bending operation, and FIG. 14 is an explanatory diagram of a bending mechanism.

As shown in FIG. 13A, there is a case where the row bar 101 is warped and bonded to the mounting base 103. It is difficult to uniformly lap the work piece, that is the row bar 101, even when the warp is present in sub-microns.

A bending mechanism is provided on the adapter 11 in order to correct the warp. As shown in FIGS. 7B and 12, the bending mechanism includes a bending arm 115 and a screw for controlling bending. The bending arm 115 pushes a wall of the mounting hole 103a of the mounting base 103. The screw 116 controls the amount of pushing the wall by the bending arm 115.

As shown in FIGS. 13B, when the bending arm 115 pushes a center position of the lower section of the wall of the hole 103a, the mounting base 103 is warped and the warp of the row bar 101 is compensated. A mount of compensation is controlled by rotating the screw 116. In here, after bonding the work piece to the row bar 101, the row bar 101 is traced by the measure to measure the warp amount. Then, the correcting ratio is determined according to the warp amount.

Figure 15:
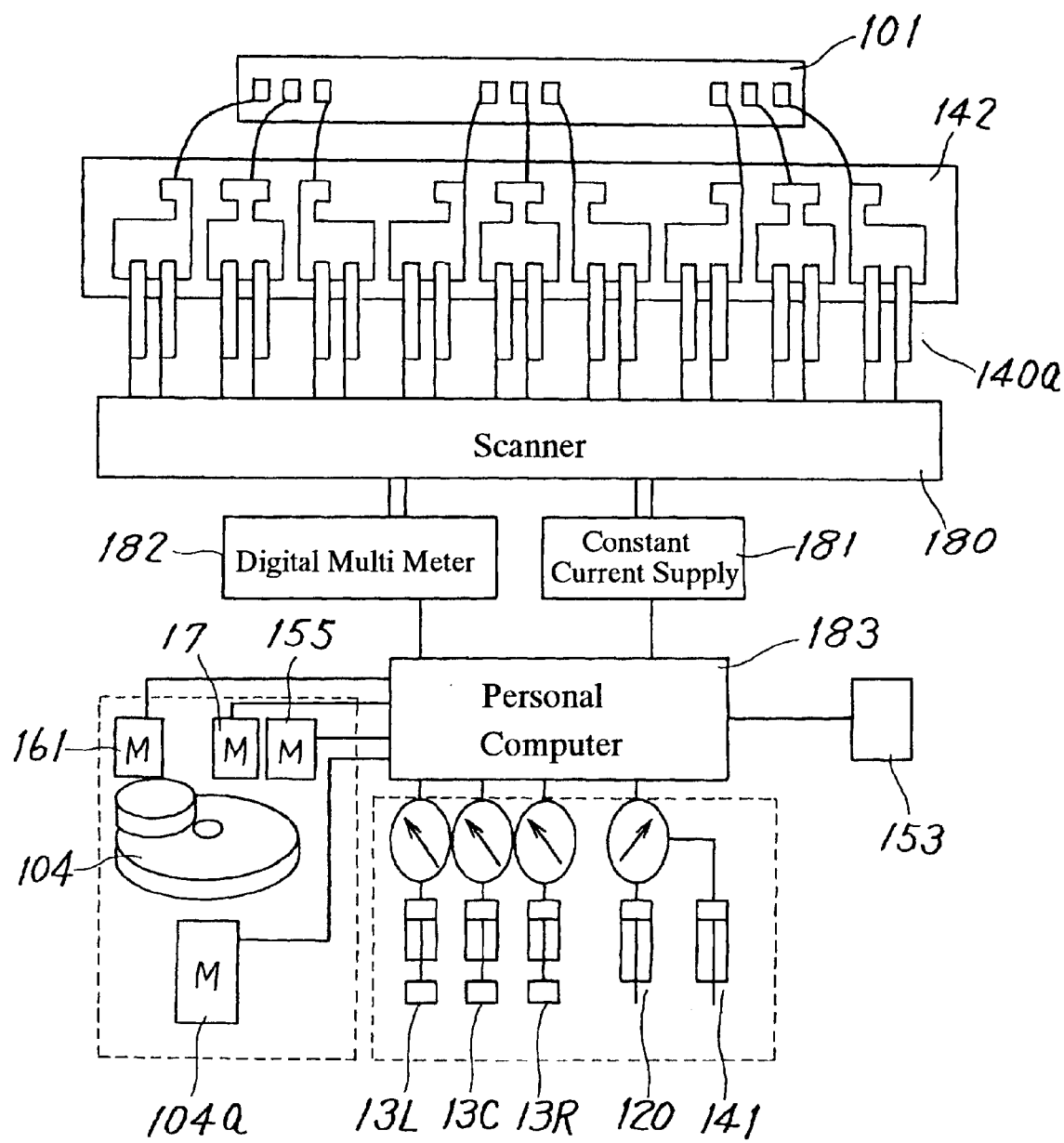
FIG. 15 is a block diagram of one embodiment according to the present invention.

As shown in FIG. 14, an automatic bending mechanism 17 is provided on the lapping base 10. A wrench 172 is engaged with the screw 116 for controlling bending, as shown in FIG. 15. A motor 171 rotates the wrench 172. A bending cylinder 170 drives the wrench 172 and the motor 171 toward the bending control screw 116.

In this example, the rotation amount of the motor 171 is controlled according to the measured warp amount to rotate the screw 116. Thereby, it becomes possible to automatically compensate the warp.

Figure 16:
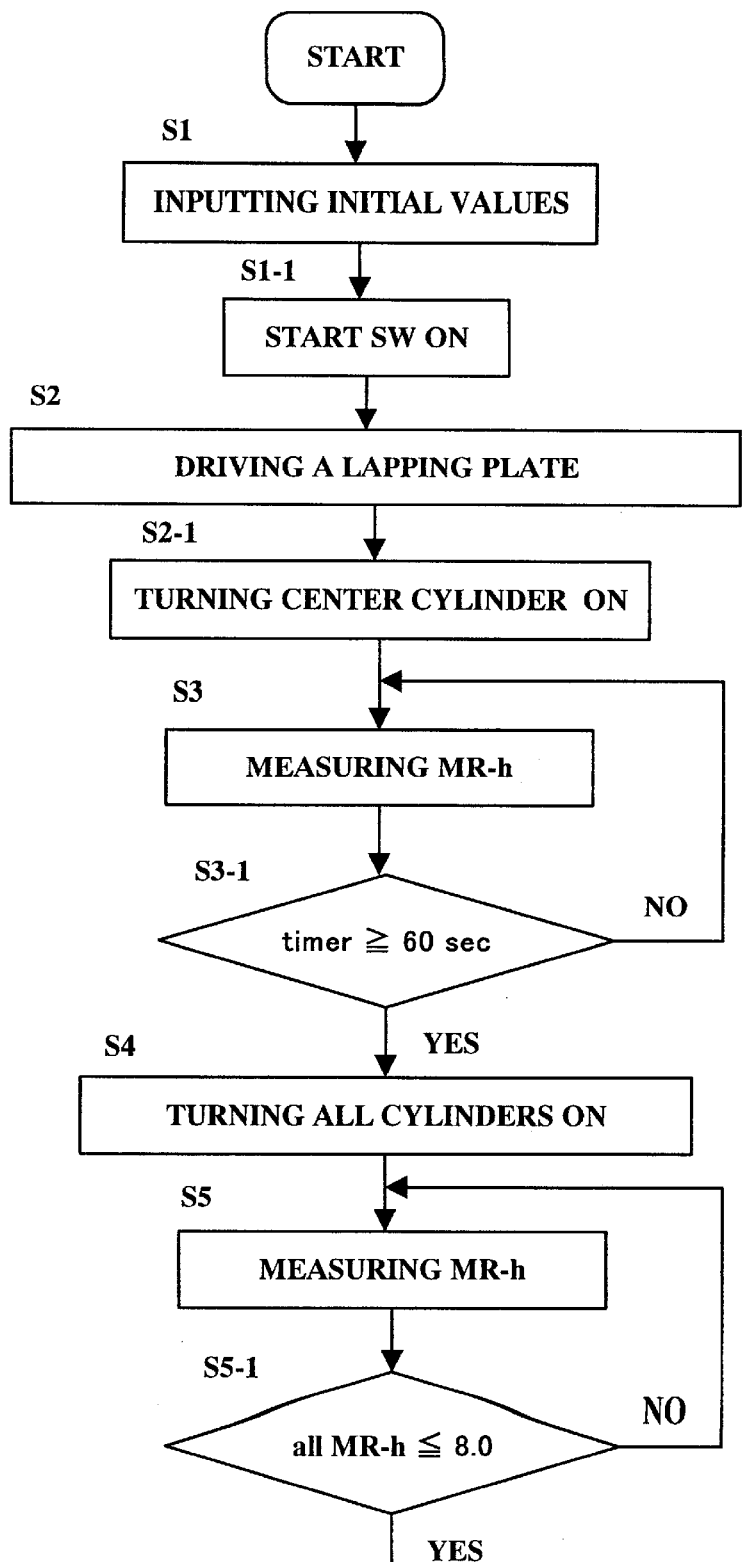
FIG. 16 is a first operational flowing chart of one embodiment according to the present invention.
Figure 17:
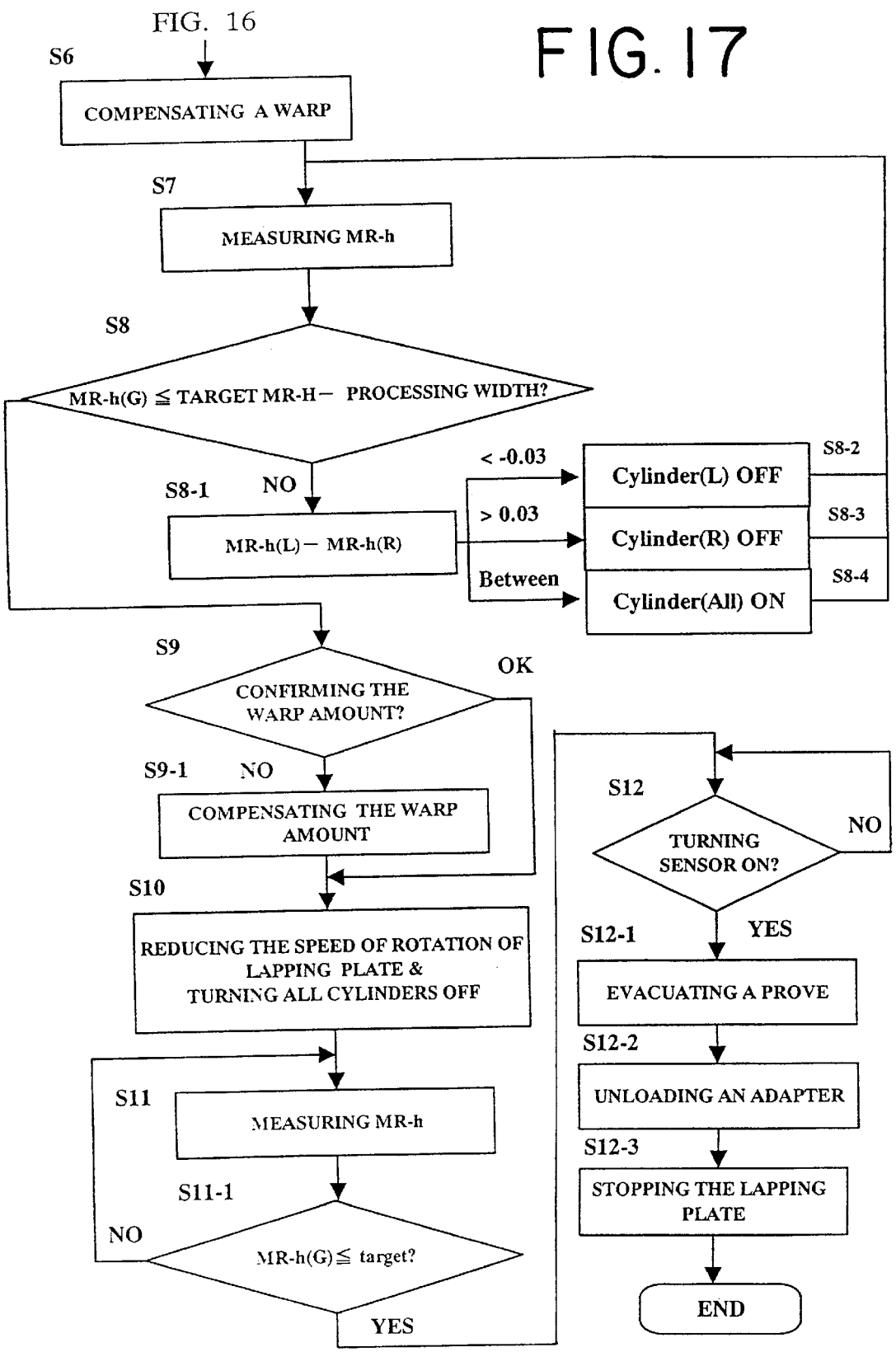
FIG. 17 is a second operational flowing chart of one embodiment according to the present invention.
Figure 18:
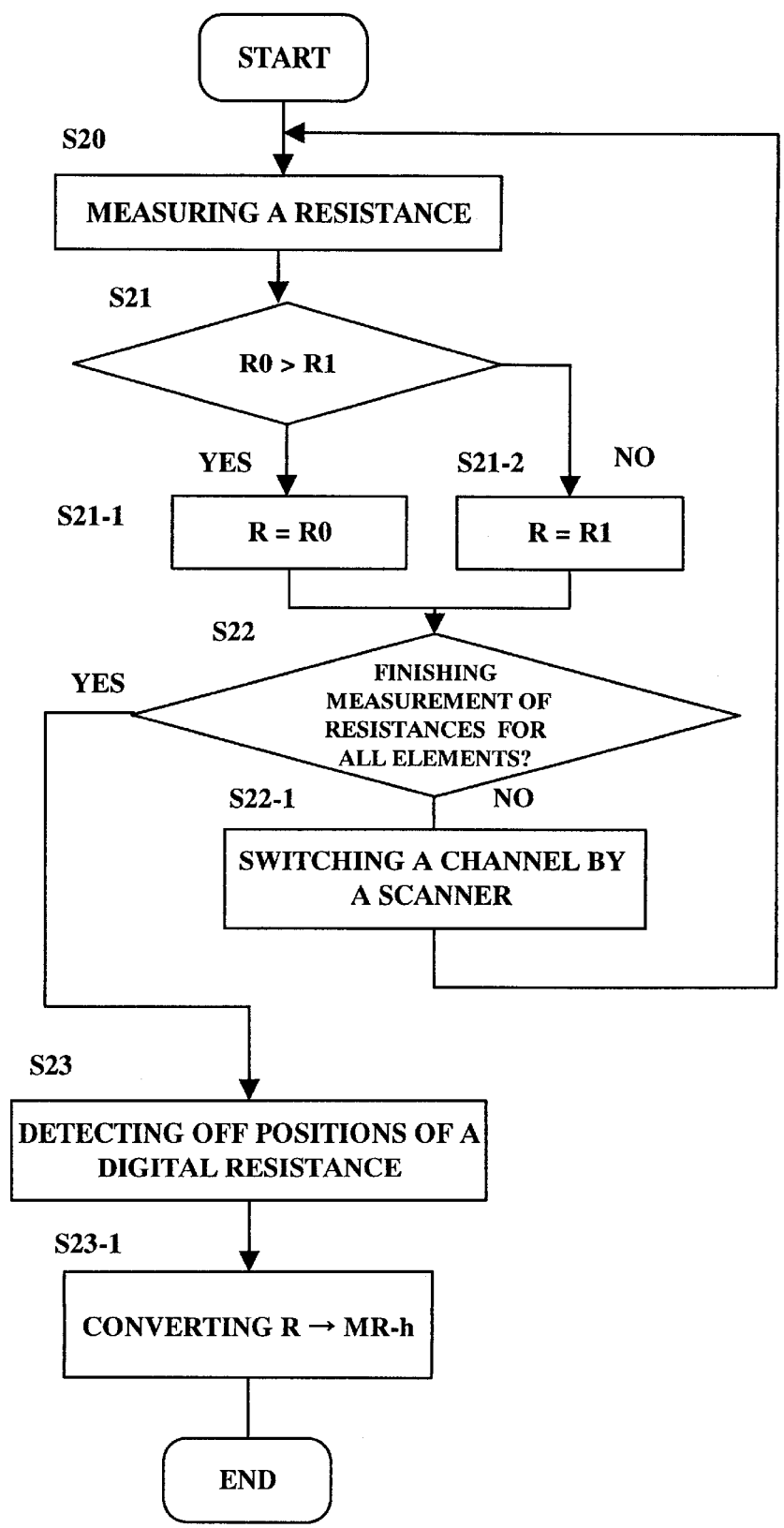
FIG. 18 is an operational flowing chart of measuring MR-h shown in FIGS. 16 and 17.

FIG. 15 is a block diagram of one embodiment according to the present invention, FIGS. 16 and 17 are operational flowing charts of lapping the work in the one embodiment, FIG. 18 is an operational flowing chart of a MR-h measurement, FIG. 19 is an explanatory diagram of a resistance value measurement operation, and FIG. 20 is an explanatory diagram of lapping processes.

As shown in FIG. 15, a scanner 180 switches channels of each probe 140a. A constant current supply 181 supplies a constant current for resistance measurement. A digital multi meter 182 measures a voltage according to an output from the scanner 180 and converts the voltage into the value of resistance. A rotary motor 104a on the lapping plate rotates the lapping plate 104.

A personal computer (hereinafter called as a controller) 183 converts the measured value of resistance outputted from the digital multi-meter 182 into the height of the ELG element (MR-h) to control each section. That is, the controller 183 controls a swing motor 155 on a lapping plate 104, a bending motor 171, a correction ring motor 161, and a rotary motor 104a. The controller 183 controls each of the pressure cylinders 13L, 13C and 13R. The controller 183 further controls a cylinder 120 for the unload mechanism 12 and a cylinder 141 for the probe mechanism 14. The controller 183 receives an output of the swing sensor 15 of the swing mechanism to control the unload mechanism 12.

Hereinafter, a processing by the controller 183 will be explained in accompanying with FIGS. 16 and 17.

At first, initial values are inputted by employing an input unit of the controller 183 (STEP S1). The initial values are, for example, the number of a semiconductor wafer, a row bar address or the like. After inputting the initial values, an operator sets the adapter 11 on the lapping base 10, and then, turns a start switch on (STEP S1-1).

The controller 183 activates the lapping plate 104 to be rotated (STEP S2). That is, the controller 183 makes the motor 104a rotate in order to rotate the lapping plate 104 with high speed. The controller 183 rotates a swing motor 155 for swing operation. The controller 183 further rotates the modified ring motor 161. The controller 183 starts to supply slurry.

Then, the controller 183 turns the center cylinder 13C on (STEP S2-1). Thereby, coarse processing (STAGE 1) is performed with the load of the one pressure cylinder. Burrs are removed from the row bar 101 by the coarse processing.

Figure 22A:
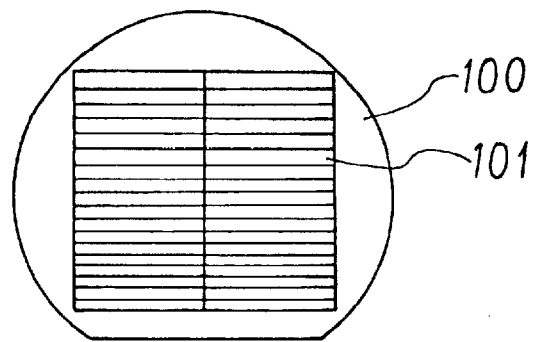
FIGS. 22A, 22B and 22C are first explanatory diagrams of manufacturing a magnetic head.
Figure 22B:
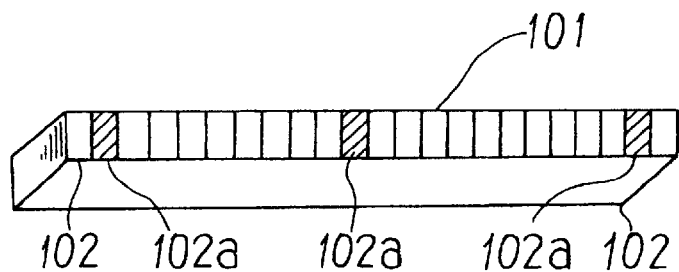
Figure 22C:
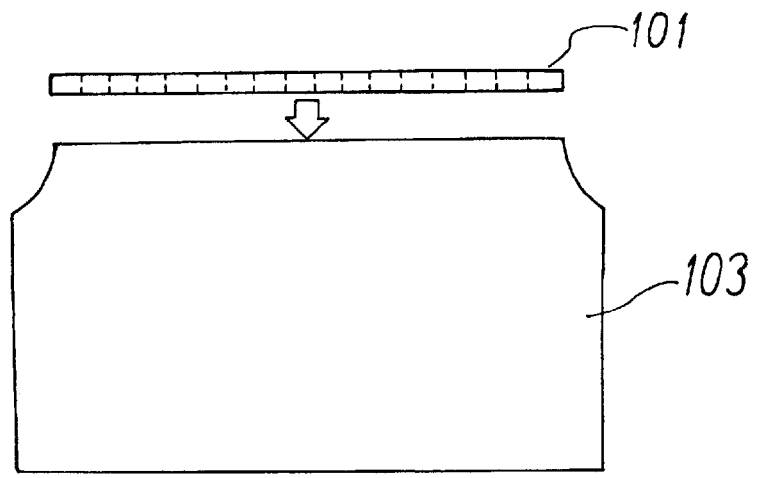
Figure 23A:
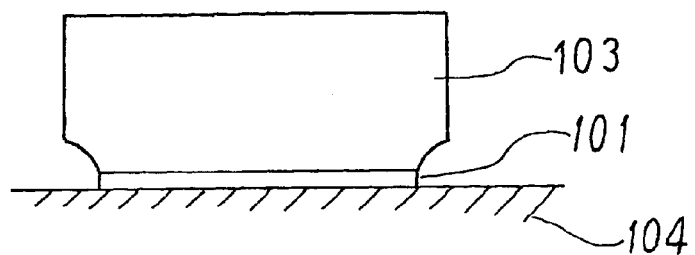
FIGS. 23A, 23B, 23C and 23D are second explanatory diagrams of manufacturing a magnetic head.
Figure 23B:
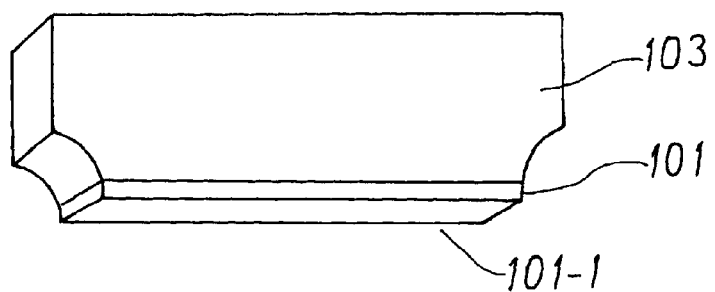
Figure 23C:
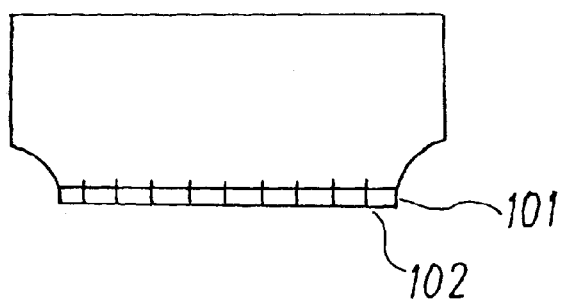
Figure 23D:
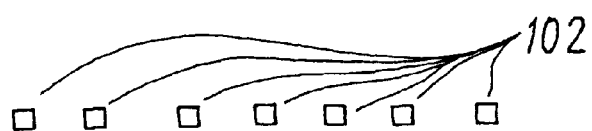
Figure 24:
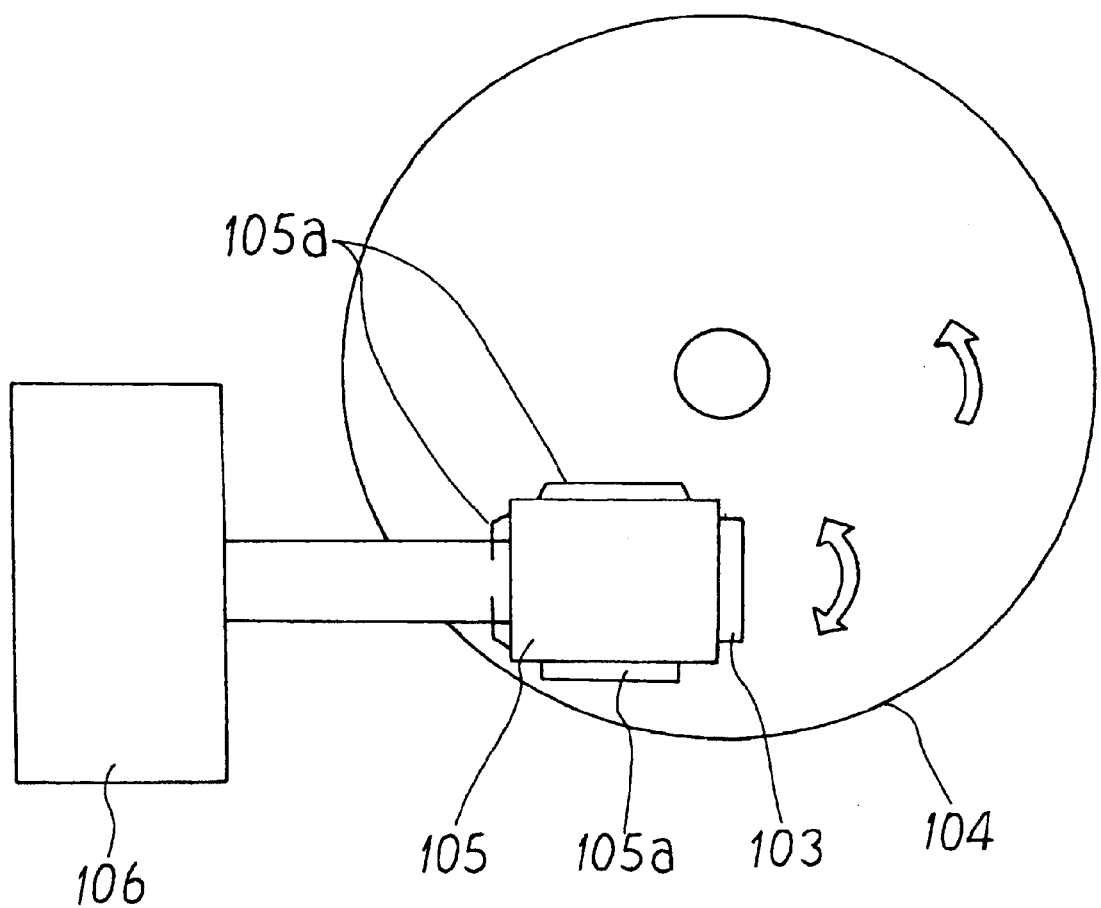
FIG. 24 is an explanatory diagram of the conventional lapping apparatus.

The controller 183 reads the resistance value from the digital multi meter 182 to measure MR-h explained in FIG. 22 (STEP S3). The controller 183 starts a timer to count from the starting of lapping the work piece, and judges whether or not the value of the timer has become 60 seconds. If the value of the timer is within 60 seconds, the controller 183 measures MR-h (STEP S3-1). That is, coarse processing is performed for 60 seconds. While coarse processing, the controller 183 measures MR-h to detect off positions of the digital resistance described above.

The controller 183 finishes coarse processing after elapsing 60 seconds. Then, the controller 183 turns all cylinders 13L, 13C and 13R of the pressure mechanism 13 on (STEP S4). That is, the controller 183 chamfers the surface of the work piece 101 by adding the load (STAGE 2). The chamfering may prevent the ELG element 102a on the row bar 101 from being shorted.

The controller 183 reads the resistance value from the digital multi meter 182 to measure MR-h explained in FIG. 18 (STEP S5). The controller 183 judges whether or not MR-h of all ELG elements positioned on the left side, the center and the right side are less than 8.0 microns (STEP S5-1). If the MR-h of all ELG elements are not less than 8.0 microns, the controller 183 continues measuring the MR-h.

Figure 19A:
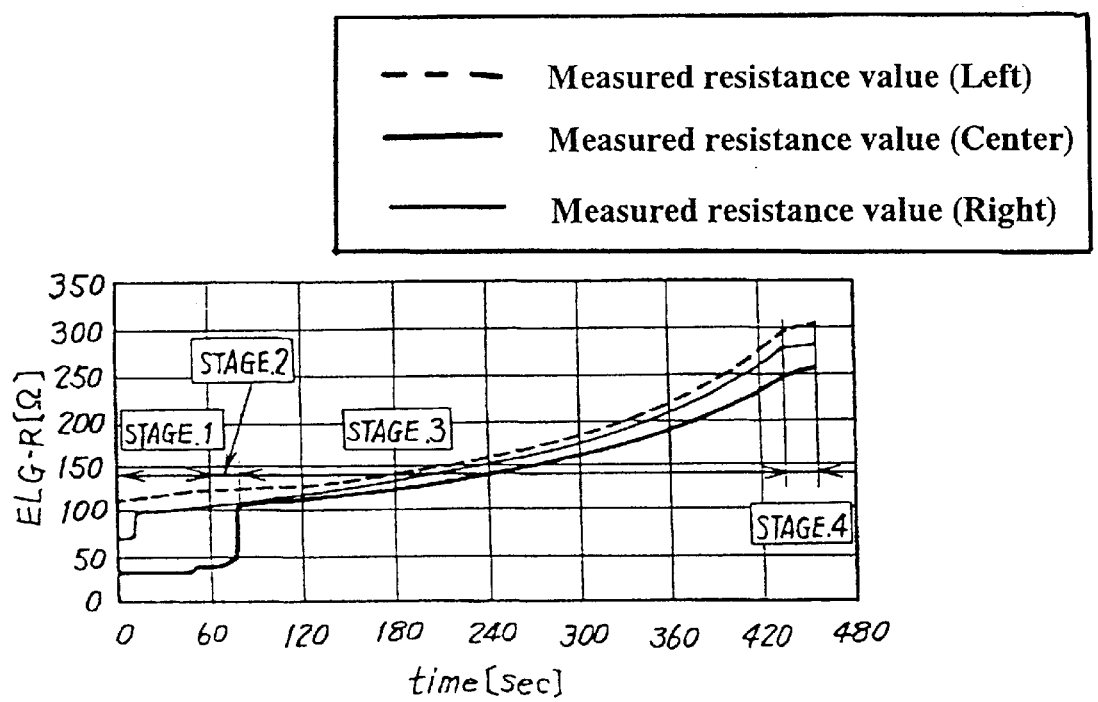
FIGS. 19A and 19B are an explanatory diagram of an operation for measuring the resistance value shown in FIGS. 16 and 17.
Figure 19B:
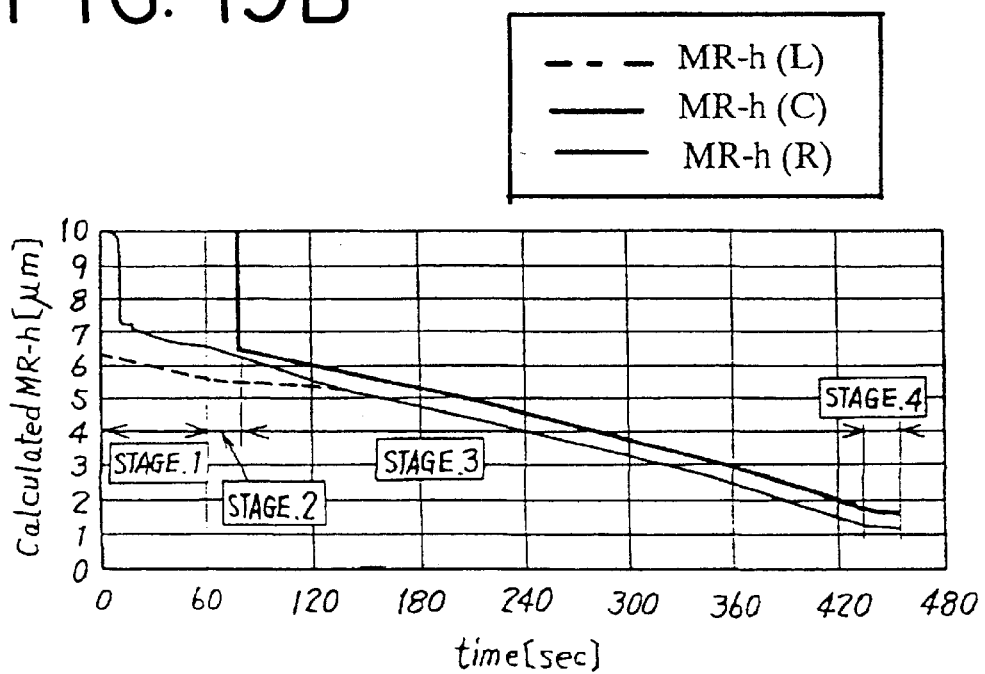
Figure 21A:
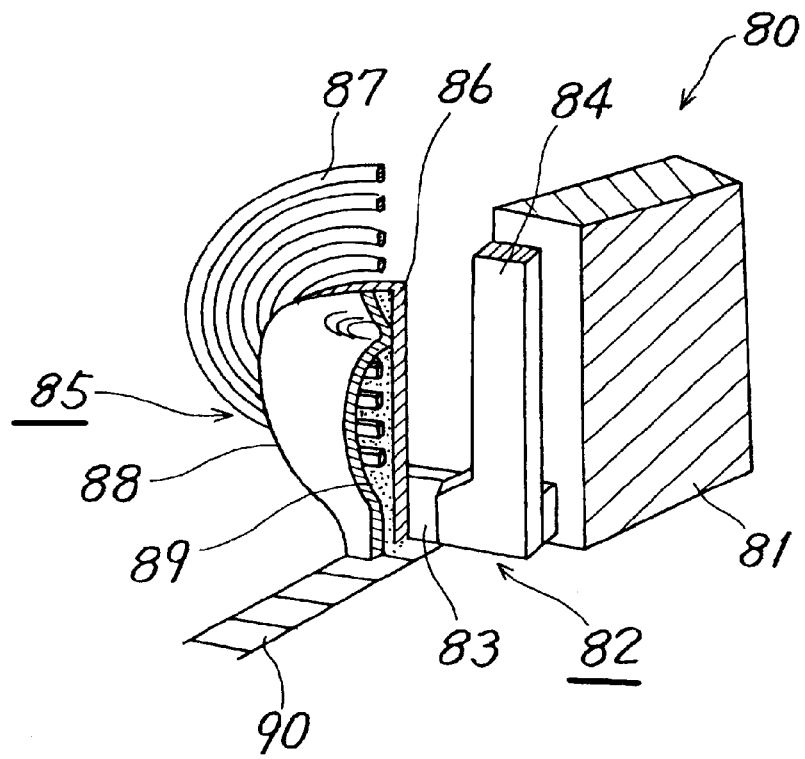
FIGS. 21A and 21B are an explanatory diagram of a compound type magnetic head.
Figure 21B:
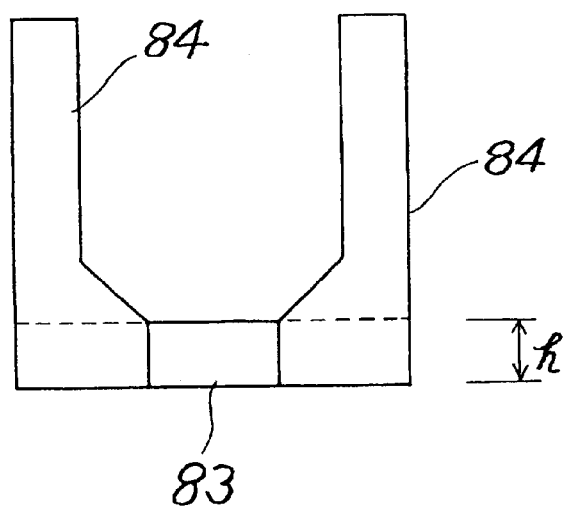

As shown in FIGS. 19A and 19B, when a partial short status occurs on the ELG element on a grinding step performed before the lapping process, the value of the analog resistance Ra (ELG-R) becomes abnormal. Therefore, the converted height MR-h also becomes abnormal. When all of MR-h reach to 8.0 microns, a partial short status can be removed and the abnormal value is canceled.

In here, the next step for controlling the process by employing the value of the analog resistance is executed.

After removing the short status, the warp compensation and light-left difference compensation (STAGE 3) are performed (STEP S6). The controller 183 rotates the bending motor 171 described in FIG. 18 to compensate the warp. The amount of the compensation is inputted to the controller 183 by measurement operation explained in FIG. 17. The controller 183 controls the bending motor 171 by the use of the compensation value.

The controller 183 reads the resistance value from the digital multi meter 182 and measures MR-h, as explained in FIG. 18 (STEP S7).

The controller 183, in order to obtain the height of the ELG element at the center of gravity, calculates an average value between the MR-h (L) which is the height of the left ELG element and the MR-h (R) which is the height of the right ELG element. Then, the controller 183 calculates an average value between the average value obtained from the above-described calculation and the MR-h (C) which is the height of the center ELG element to obtain the MR-h (G) which is the height of the ELG element on the center of gravity. The controller 183 judges whether or not the MR-h (G) on the center of gravity is less than (the targeted MR-h—the finishing width) (STEP S8). If the MR-h (G) of the ELG element on the center of the gravity is not less than (the targeted MR-h—the finishing width), left-right difference modification is performed. The controller 183 finds a difference X between the MR-h (L) which is the height of the left ELG element and the MR-h (R) which is the height of the right ELG element (STEP S8-1).

If the difference X is more than −0.03 microns, the right end of the row bar 101 is 0.03 microns (allowable amount) higher than the left end. Therefore, the left pressure cylinder 13L in the pressure mechanism 13 is turned to off to lighten the load on the left end, and then returning back to the step S7 (STEP S8-2).

On the other hand, the difference X is more than 0.03 microns, the left end of the row bar 101 is 0.03 microns (allowable amount) higher than the right end. Therefore, the right cylinder 13R is turned to off to lighten the load on the right end, and then, returning back to the step S7 (STEP S8-3).

When the difference X is between −0.03 microns and 0.03 microns, the left-right difference of the row bar 101 is in the allowable range. Then, all of the pressure cylinders 13L, 13C and 13R are turned to on, and returning back to the step S7 (STEP S8-4).

The controller 183 confirms the warp amount (STEP S9). At first, a difference Y between of the MR-h (C) which is the height of the center ELG element and the average value between the MR-h of the heights of the ELG elements on the left and right ends is obtained. The controller 183 judges whether or not the difference Y is more than the allowable value 0.03 microns. If the difference is not more than 0.03 microns, going to the next step S10. On the other hand, the difference Y is more than the allowable value, the warp compensation amount explained in the step S6 is performed (STEP S9-1). The compensation amount is obtained from the above-described difference Y.

The controller 183 goes to the fine processing (STAGE 4). Then, the controller 183 controls the motor 104a to reduce the rotation speed of the surface plate 104. The controller 183 turns all of the pressure cylinders 13L, 13C and 13R in the pressure mechanism 13 to off. The fine processing is performed without giving the load (STEP S10).

The controller 183 reads the resistance value from the digital multi meter 182 to measure the MR-h described in FIG. 22 (STEP S11). The controller 183 judges whether or not the MR-h (G) that is the height of the ELG element on the center of gravity is less than the targeted value (STEP S11-1).

When the controller 183 detects that the height MR-h (G) is less than the targeted value, the processing is controlled for finishing. The controller 183 judges whether or not the swing sensor 153 described in FIG. 3 is turned to on (STEP S12). When the swing sensor 153 is turned to on, as described above, the lapping base 10 is positioned on the predetermined position P.

The controller 183 activates the probe cylinder 141 to evacuate the probe 140 (STEP S12-1). Next, the controller 183 activates the unload cylinder 120 of the unload mechanism 12 to evacuate the mounting base 103 from the lapping plate 104 (STEP S12-2). Then, the controller 183 stops the lapping plate 104 and finishes the processing (STEP S12-3).

In this way, the coarse processing and the fine processing are continuously executed by changing conditions for the lapping. Therefore, it is possible to realize high productivity differently in comparison with the apparatus, in which coarse and fine processings are discontinuously or separately executed. Further, it is also possible to save an operator from troublesomeness.

The MR-h measurement will be explained according to FIG. 18.

The controller 183 reads the resistance value from the digital multi meter 182 (STEP S20).

The controller 183 compares the previously measured resistance value R0 with the just measured resistance value R1 (STEP S21). If the previously measured resistance value R0 is larger than the value R1, the previously measured value R0 is employed as the resistance value R (STEP S21-1). If the value R0 is not larger than the value R1, the value R1 is employed as the value R (STEP S21-2).

As explained in FIG. 10B, the value of resistance becomes larger, depending on the reduction of the height of the element. Accordingly, if it is normal, a value on a later sampling is larger than a value of resistance on a previously measured sampling. However, there is a case where the value of resistance becomes abnormal due to a partial short status of the element or influence of abrasive liquid. To remove the abnormal value of resistance, the following processing is performed:

The controller 183 judges whether or not the resistance values of all ELG elements have been measured (STEP S22). If the measurement has not been finished for all ELG elements, a channel of the scanner 180 is switched, and the processing is returned to the step s20 (STEP S22-1).

When the controller 183 finishes the measurement of the resistance values for all ELG elements, the controller 183 detects an off position of the digital resistance element from the variation of the resistance value (STEP S23). As described above, when the controller 183 detects the off position of the digital resistance element, the controller 183 obtains coefficients shown in the equation (1). The controller 183 converts the measured resistance value R into the height MR-h and finishes the processing (STEP S23-1).

As shown in FIG. 20, on the coarse processing on the stage 1, the cambering process on the stage 2 for removing an abnormal value, and the left-right difference modifying process on the stage 3, the rotary number of the lapping plate is large (50 rpm), and additionally, the pressure process is also performed by the pressure mechanism 13. Therefore, it is possible to process with high speed.

On the other hand, when the remaining amount for lapping the work piece reaches to the predetermined value, the fine processing is performed on the stage 4. On the fine processing, the rotary time of the lapping plate is small (15 rpm), and the pressure process is not performed by the pressure mechanism 13. Therefore, the speed for processing becomes low.

As coarse processing and fine processing are continuously executed in one lapping apparatus by varying the processing speed in this way, it is realized to greatly increase the productivity. Further, as an operator sets the work piece only one time, the operator can save the time.

Although the present invention has been described with reference to embodiments, the invention is not restricted to those. The following modification can be applicable.

(1) In the above-described embodiments, a row bar formed of a row of the magnetic heads as lapped parts is explained as one example. However, it is possible to apply the present invention to lap other parts.

(2) Other elements can be used as the elements for monitoring.

As explained above, the present invention takes effect as follows:

(1) As automatically going from the coarse processing to the fine processing according to the remaining amount for lapping the work piece in one lapping apparatus, it is realized to save time of lapping the work piece and improve the quality for the processing.

(2) The coarse processing and the fine processing are executed on one lapping apparatus. Therefore, an operator sets the work piece only one time, thus reducing time for operation.

(3) As automatically going from the coarse processing to the fine processing by detecting the remaining amount for lapping the work piece, it is possible to automatically proceed from the coarse processing to the fine processing on the appropriate time.

The present invention may be embodied in other specific forms without departing from the sprit or essential characteristics thereof. It should of course be understood that those which are the same as the technical concept of the invention are within the protective scope of the present invention.

What is claimed is:

1. An automatic lapping method for lapping a work piece by moving a mounting base to which the work piece is mounted relative to a lapping plate comprising the steps of:

coarse-lapping a work piece of a row bar by contacting a lapping plate to the work piece and rotating the lapping plate at a first rotating speed;

monitoring resistance elements provided on the work piece, during the coarse-lapping;

calculating a height value of a surface of the work piece from resistance values of the resistance elements, the calculating step including the steps of, obtaining a first average value of heights which are calculated from resistance values of resistance elements provided on two edges of the work piece surface; and obtaining a second average value of the first average value and a height value which is calculated from a resistance value of a resistance element provided on a center of the work piece surface; and fine-lapping the work piece by rotating the lapping plate at a second speed slower than the first rotating speed, when the calculated height value of the work piece surface becomes less than a predetermined value.

2. The automatic lapping method according to claim 1, wherein by the calculating step, the relation of the height value of the work piece surface with the resistance values of the resistance elements is obtained as $$Ra = a/h + b$$

wherein "Ra" is the resistance value of the resistance element, "h" is the height value of the work piece surface, and "a" & "b" are predetermined coefficients.

3. The automatic lapping method according to claim 1, wherein pressures are supplied on the work piece through plural air-cylinders during the step of coarse-lapping.

4. The automatic lapping method according to claim 3, wherein the plural air-cylinders include a first cylinder supplying pressure on the position corresponding to a center of the work piece surface, and second and third cylinders respectively supply pressures on the positions corresponding to two edges of the work piece surface.

5. The automatic lapping method according to claim 4, wherein the pressure is supplied through the first cylinder for a predetermined period, and is supplied through all of the first, second and third cylinders after the predetermined period.

6. The automatic lapping method according to claim 5, wherein the step of calculating a height value of the work piece surface includes the steps of:

obtaining a first average value of heights which are calculated from resistance values of resistance elements provided on the two edges of the work piece;

obtaining a second average value of the first average value and a height value which is calculated from a resistance value of a resistance element provided on the center of the work piece;

obtaining the difference between the heights of the two edges of the work piece surface, which are respectively calculated from resistance values of the resistance elements provided on the two edges of the work piece when the second average value is higher than the predetermine value;

stopping supplying the pressure through the second cylinder on one of the edges of the work piece surface when the difference of heights between the resistance elements provided on the one and the other edge of the work piece surface is less than a predetermined negative value;

stopping supplying the pressure through the third cylinder on the other edge of the work piece surface when the difference of heights between the resistance elements provided on the one and the other edges of the work piece surface is larger than a predetermined positive value; and continuing supplying pressure through all of the first, second and third cylinders when the difference of heights of the work piece is between the predetermined positive and negative values.

7. An automatic lapping apparatus for lapping a magnetic resistance element which is cut out into plural chips, each of which is used for a magnetic head by moving a mounting base to which the magnetic resistance element is mounted relative to a lapping plate, the apparatus comprising;

a lapping plate;

a monitoring circuit monitoring resistance values of resistance elements provided on the magnetic resistance element; and a controller controlling rotation speed of the lapping plate at a first rotating speed.

obtaining a first average value of heights which are calculated from resistance values of resistance elements provided on two edges of the magnetic resistance element, a second average value of the first average value, and a height value which is calculated from a resistance value of a resistance element provided on a center of the magnetic resistance element between the edges, and continuing to lap the magnetic resistance element by rotating the lapping plate at a second rotation speed slower than the first rotation speed, when the second average value becomes less than a target value.

8. The automatic lapping apparatus according to claim 7, wherein by the calculating step, the relation of the height value of the magnetic resistance element with the resistance values of the resistance elements is obtained by the controller as Ra=a/h+b wherein "Ra" is the resistance value of the resistance element, "h" is the height value of the magnetic resistance element, and "a" & "b" are predetermined coefficients.

9. The automatic lapping apparatus according to claim 7, further comprising plural air-cylinders supplying pressures on the magnetic resistance element during lapping of the magnetic resistance element at the first rotation speed.

10. The automatic lapping apparatus according to claim 9, wherein the plural air-cylinders include a first cylinder supplying pressure on the position corresponding to the center of the magnetic resistance element, and second and third cylinders respectively supply pressures on the positions corresponding to the edges of the magnetic resistance elements.

11. The automatic lapping apparatus according to claim 10, wherein the pressure is supplied through the first cylinder for a predetermined period, and is supplied through all of the first, second and third cylinders after the predetermined period.

12. The automatic lapping apparatus according to claim 11, wherein to calculate a height value of the magnetic resistance element, the controller further obtains a first average value of heights which are calculated from resistance values of resistance elements provided on both edges of the magnetic resistance element, obtains a second average value of the first average value and a height value which is calculated from a resistance value of a resistance element provided on the center of the magnetic resistance element and obtains the difference between heights of the edges of the magnetic resistance element, which are respectively calculated from resistance values of the resistance elements provided on the edges of the magnetic resistance element when the second average value is higher than the predetermined value, and the controller stops supplying the pressure through the second cylinder when the difference of heights between the resistance elements provided on the one and the other edges of the magnetic resistance element is less than a predetermined negative value, stops the pressure through the third cylinder when the difference of heights between the resistance elements provided on the one and the other edges of the magnetic resistance element is larger than a predetermined positive value; and the controller continues supplying pressure through all of the first, second and third cylinders when the difference of heights between the resistance elements provided on the one and the other edges of the magnetic resistance element is between the predetermined positive and negative values.

* * * * *

UNITED STATES PATENT AND TRADEMARK OFFICE
CERTIFICATE OF CORRECTION

PATENT NO.   : 6,196,897 B1
DATED        : March 6, 2001
INVENTOR(S)  : Suto et al.

It is certified that error appears in the above-identified patent and that said Letters Patent is hereby corrected as shown below:

<u>Title page,</u>
Item [73], Assignee, "Fujitsu Limted" should read -- Fujitsu Limited --.

Signed and Sealed this

Ninth Day of April, 2002

Attest:

JAMES E. ROGAN
*Attesting Officer*    *Director of the United States Patent and Trademark Office*